(12) United States Patent
Lee et al.

(10) Patent No.: US 8,685,502 B2
(45) Date of Patent: Apr. 1, 2014

(54) LIQUID CRYSTAL DISPLAY

(75) Inventors: Jun-Hyup Lee, Seoul (KR); Jae-Jin Lyu, Yongin-si (KR)

(73) Assignee: Samsung Display Co., Ltd. (KR)

( * ) Notice: Subject to any disclaimer, the term of this patent is extended or adjusted under 35 U.S.C. 154(b) by 577 days.

(21) Appl. No.: 12/416,548

(22) Filed: Apr. 1, 2009

(65) Prior Publication Data

US 2010/0033662 A1    Feb. 11, 2010

(30) Foreign Application Priority Data

Aug. 7, 2008    (KR) .................. 10-2008-0077644

(51) Int. Cl.
*C09K 19/00* (2006.01)

(52) U.S. Cl.
USPC ............. 428/1.1; 428/1.2; 349/191; 349/183; 349/123; 349/130; 430/281.1; 430/285.1; 430/286.1; 430/288.1

(58) Field of Classification Search
USPC ............. 428/1.2, 1.1; 349/123, 127, 130, 136, 349/191, 183; 430/281.1, 285.1, 286.1, 430/288.1
See application file for complete search history.

(56) References Cited

U.S. PATENT DOCUMENTS

| | | | |
|---|---|---|---|
| 5,518,652 A * | 5/1996 | Parri et al. | 252/299.01 |
| 6,395,351 B1 * | 5/2002 | Benecke et al. | 428/1.1 |
| 2004/0161549 A1 * | 8/2004 | Niyama et al. | 428/1.1 |
| 2006/0202162 A1 | 9/2006 | Lin et al. | |
| 2006/0209242 A1 * | 9/2006 | Sohn et al. | 349/139 |
| 2008/0001121 A1 | 1/2008 | Tanabe | |

FOREIGN PATENT DOCUMENTS

| | | |
|---|---|---|
| JP | 2002501111 | 1/2002 |
| JP | 2003-307720 | 10/2003 |
| JP | 2004-302061 | 10/2004 |
| JP | 2004277488 | 10/2004 |
| JP | 2005-010202 | 1/2005 |
| JP | 2005-338613 | 12/2005 |
| JP | 2006-078968 | 3/2006 |
| JP | 2006-139046 | 6/2006 |
| JP | 2006-267689 | 10/2006 |
| JP | 2006282579 | 10/2006 |
| JP | 2006291096 | 10/2006 |
| JP | 2006-317866 | 11/2006 |
| KR | 1020010071865 | 7/2001 |
| KR | 1020060123899 | 12/2006 |
| KR | 1020070029100 | 3/2007 |
| KR | 1020070119007 | 12/2007 |
| KR | 1020080003298 | 1/2008 |

* cited by examiner

*Primary Examiner* — Gwendolyn Blackwell
*Assistant Examiner* — Ruiyun Zhang
(74) *Attorney, Agent, or Firm* — Cantor Colburn LLP

(57) ABSTRACT

A liquid crystal display including a first substrate; a second substrate facing the first substrate; a first field generating electrode disposed on the first substrate; a second field generating electrode disposed on the second substrate; and a liquid crystal layer disposed between the first substrate and the second substrate, the liquid crystal layer including a liquid crystal and an alignment assistant, wherein the alignment assistant includes a mesogen and two or more photo-polymerizable groups.

7 Claims, 8 Drawing Sheets

(a)

(b)

LIQUID CRYSTAL DISPLAY

This application claims priority to Korean Patent Application No. 10-2008-0077644, filed on Aug. 7, 2008, and all the benefits accruing therefrom under 35 U.S.C. §119, the contents of which in its entirety are herein incorporated by reference.

BACKGROUND OF THE INVENTION (a) Field of the Invention

This disclosure relates to a liquid crystal display.

(b) Description of the Related Art

Liquid crystal displays ("LCD"s) are a widely used type of flat panel display. An LCD includes two display panels on which field-generating electrodes are disposed, and a liquid crystal layer interposed between the panels. In the LCD, a voltage is applied between the field generating electrodes to generate an electric field. The electric field controls the alignment of liquid crystal molecules in a liquid crystal layer. Accordingly, a transmittance of light passing through the liquid crystal layer can be controlled.

In an LCD, control of the liquid crystals is important to obtain a desired image, which is generated by control of transmitted of light. In particular, because LCD applications have become more diverse, it would be desirable to ensure various characteristics, including a low driving voltage, a high voltage holding ratio ("VHR"), a wide viewing angle, a wide operation temperature range, and a high-speed response.

A liquid crystal layer includes a liquid crystal composition including various types of liquid crystal components so as to satisfy the above-mentioned characteristics.

In addition, it is important for the liquid crystals to be initially aligned.

To obtain a satisfactory initial alignment of the liquid crystals, a pretilt of the liquid crystals must be uniform. When the pretilt of the liquid crystals is not uniform, the initial alignment of the liquid crystals can be such that it is difficult to control light passing through the liquid crystal layer, resulting in reduced the contrast ratio. In addition, pretilt differences can be observed as an afterimage, thereby deteriorating display quality.

BRIEF SUMMARY OF THE INVENTION

Accordingly, an exemplary embodiment reduces an afterimage in a liquid crystal display, which may be caused by a difference of a pretilt of a liquid crystal, and thus improves a display characteristic.

The above described and other drawbacks are alleviated by a liquid crystal display including a first substrate; a second substrate facing the first substrate; a first field generating electrode formed on the first substrate; and a second field generating electrode disposed on the second substrate; and a liquid crystal layer disposed between the first substrate and the second substrate, the liquid crystal layer including a liquid crystal and an alignment assistant, wherein the alignment assistant includes a mesogen and two or more photo-polymerizable groups.

The mesogen may include at least one group selected from the group consisting of a naphthalene group, a biphenyl group, a bisphenol-A group, a fluorine substituted naphthalene group, a fluorine substituted biphenyl group, a fluorine substituted bisphenol-A group, and a combination including at least one of the foregoing groups.

The photo-polymerizable group may include at least one group selected from the group consisting of an acrylate group, a methacrylate group, and a combination including at least one of the foregoing groups.

The liquid crystal display may further include a $C_3$-$C_{12}$ alkyl group disposed between the mesogen and the photo-polymerizable group.

The alignment assistant may include at least one compound selected from the group of compounds represented by Chemical Formulas 1 to 4:

[Chemical Formula 1]

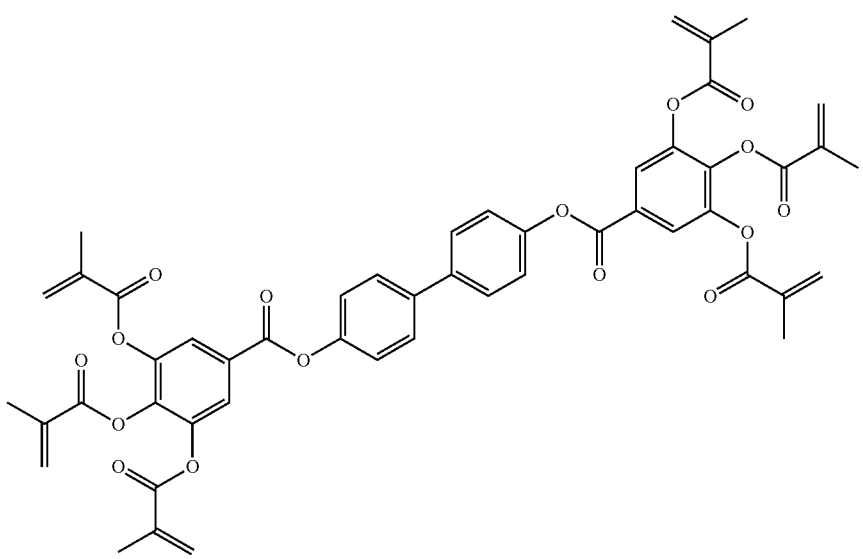

-continued
[Chemical Formula 2]
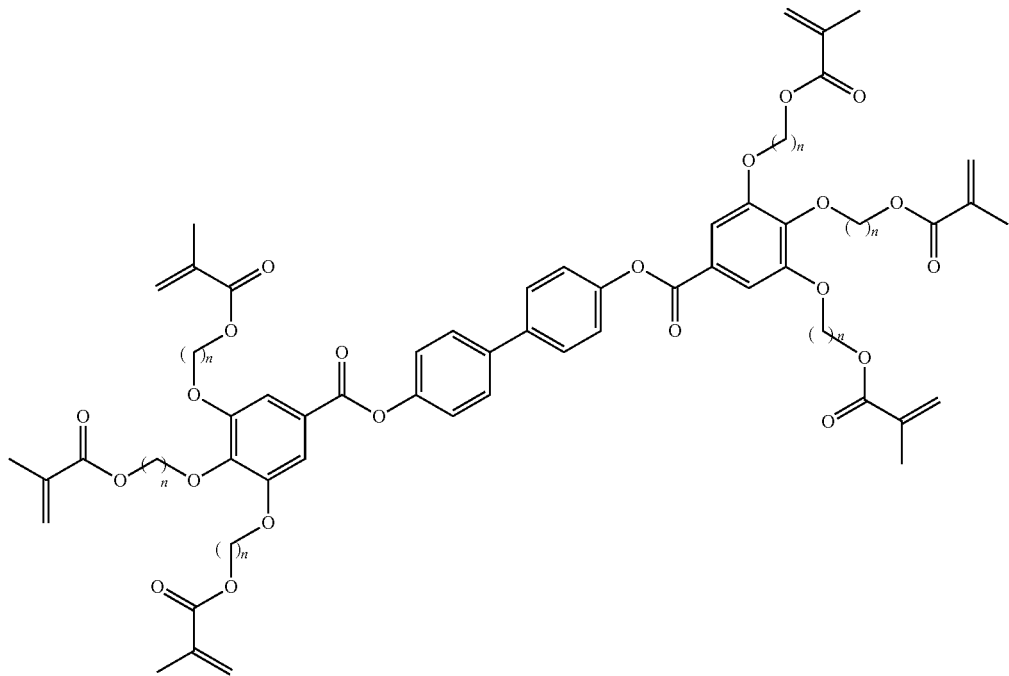
[Chemical Formula 3]
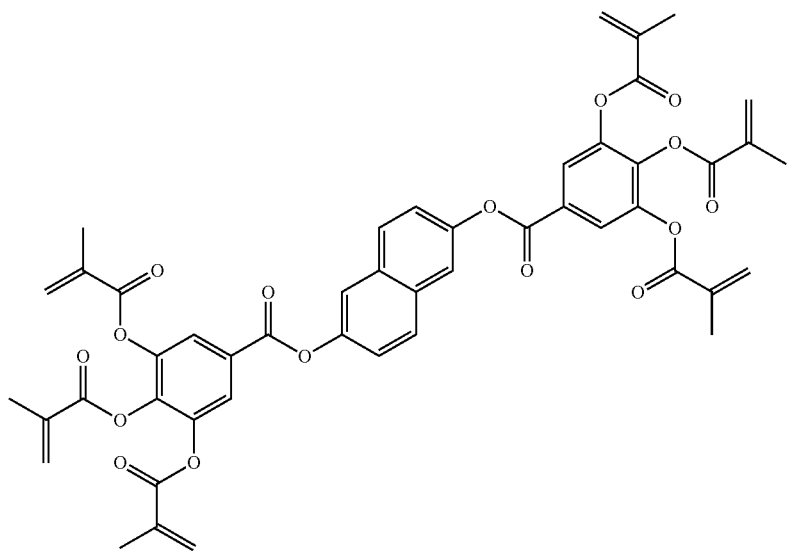

[Chemical Formula 4]

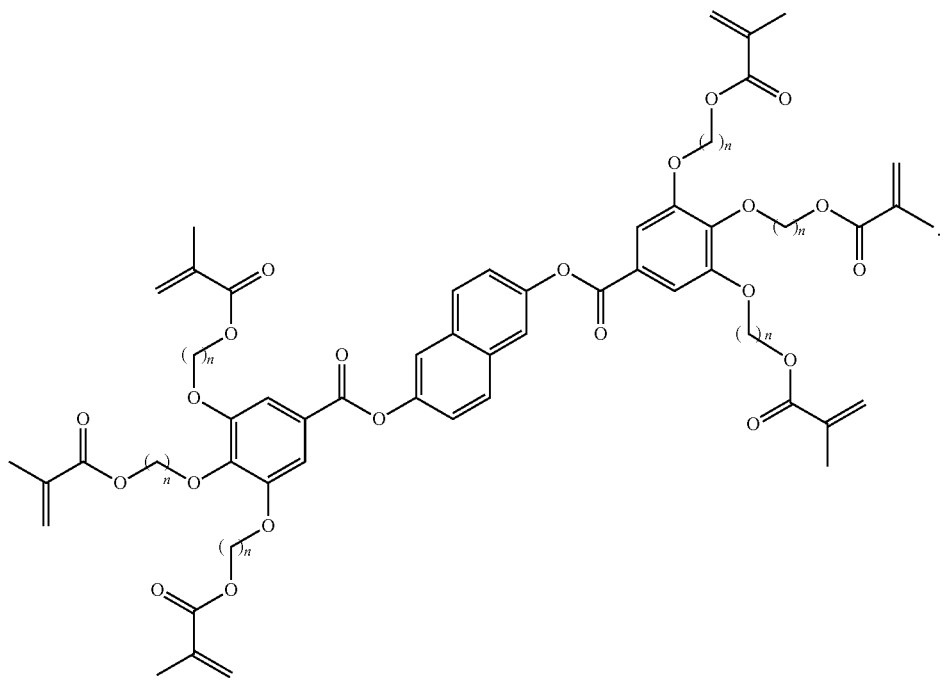

The alignment assistant may be contained in an amount between about 0.1 weight percent (wt. %) to about 10 wt % with respect to the content of the liquid crystals.

In an embodiment, at least one of the first and the second field generating electrodes may include a branch shape.

In an embodiment, the alignment assistant may comprise a non-polymerized alignment assistant; and the non-polymerized alignment assistant may be contained in an amount equal to or less than about 5 wt. % with respect to a total content of the alignment assistant.

Also disclosed is a liquid crystal display including a first substrate; a second substrate facing the first substrate; a first field generating electrode disposed on the first substrate; a second field generating electrode disposed on the second substrate; and a liquid crystal layer disposed between the first substrate and the second substrate, the liquid crystal layer including a liquid crystal, a first alignment assistant and a second alignment assistant, wherein the first alignment assistant includes a non-mesogen and three or more photo-polymerizable groups, and a second alignment assistant includes a mesogen and two or more photo-polymerizable groups.

The photo-polymerizable group may include at least one group selected from the group consisting of an acrylate group, a methacrylate group, and a combination including at least one of the foregoing photo-polymerizable groups.

The first alignment assistant may include at least one compound selected from the group of compounds represented by Chemical Formulas 5 to 10:

[Chemical Formula 5]

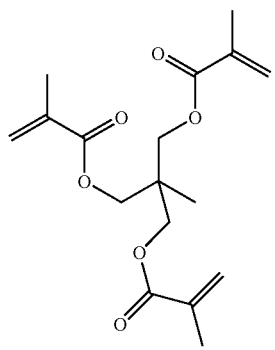

[Chemical Formula 6]

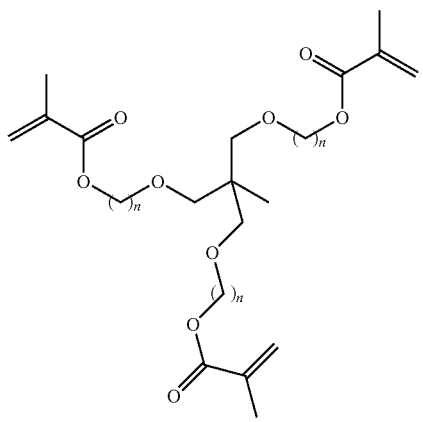

[Chemical Formula 7]
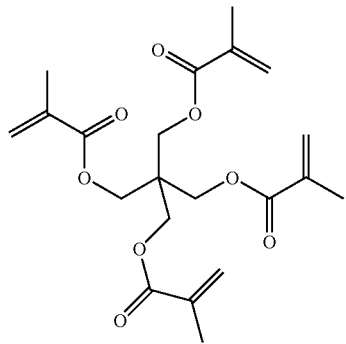
[Chemical Formula 8]
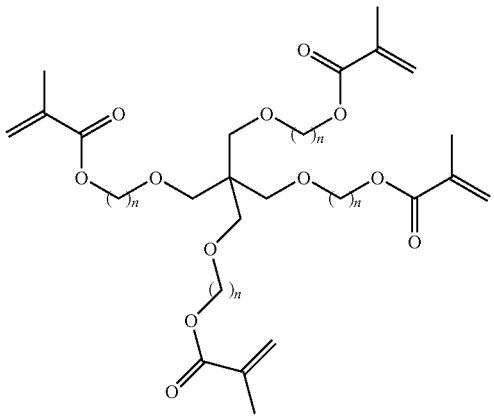
[Chemical Formula 9]
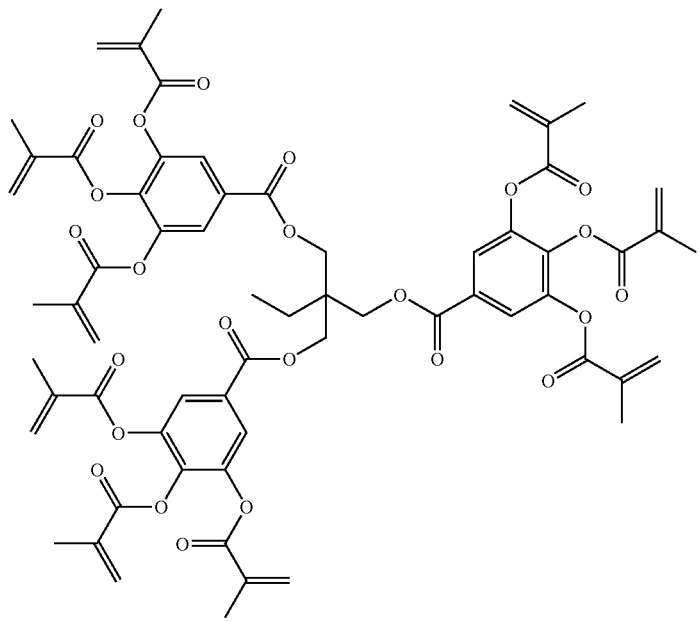
[Chemical Formula 10]
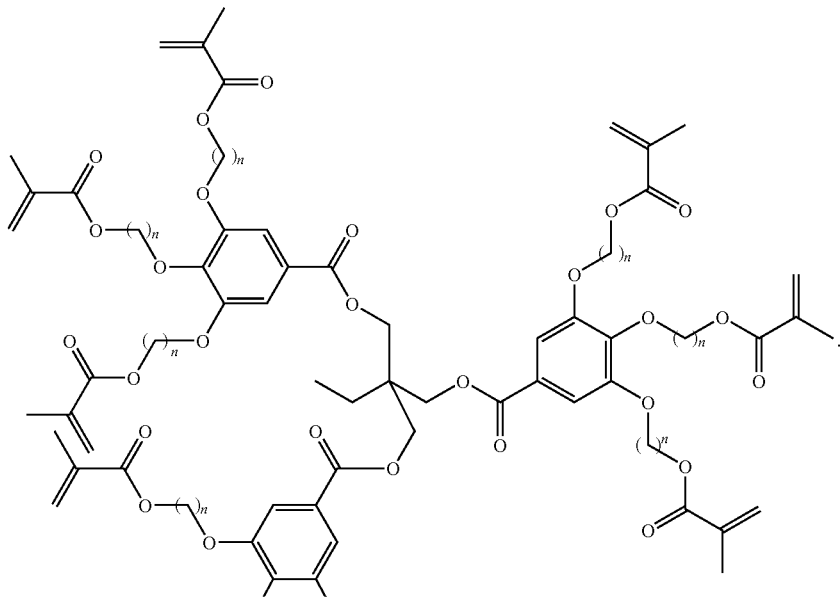

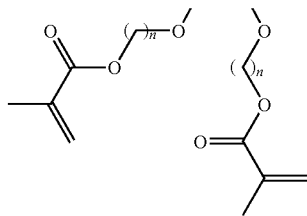

The second alignment assistants may include at least one compound selected from the group of compounds represented by Chemical Formulas 1 to 4 and Chemical Formulas 11 to 21:

[Chemical Formula 11]

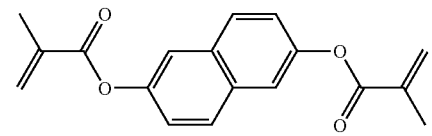

[Chemical Formula 12]

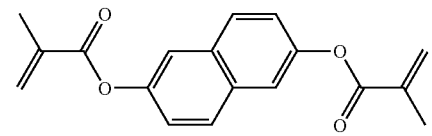

[Chemical Formula 13]

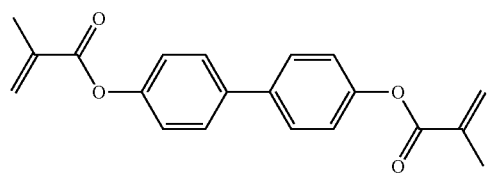

[Chemical Formula 14]

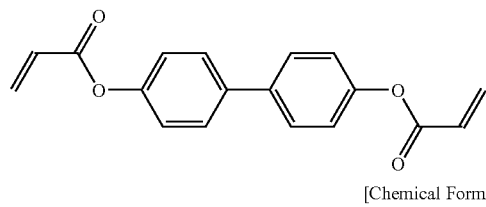

[Chemical Formula 15]

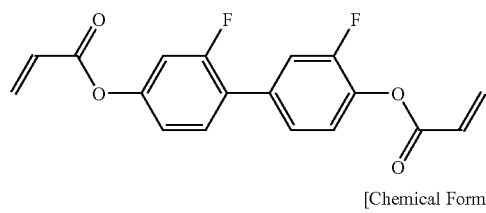

[Chemical Formula 16]

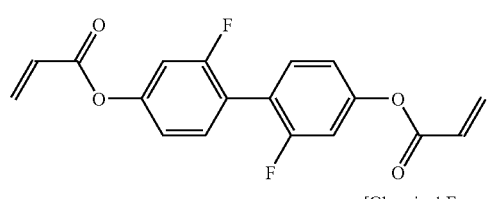

[Chemical Formula 17]

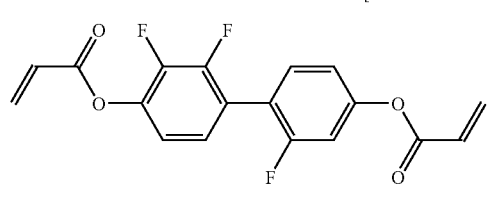

[Chemical Formula 18]

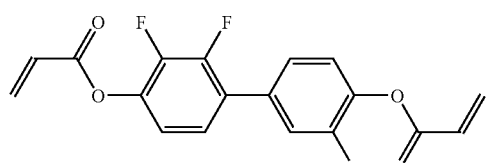

[Chemical Formula 19]

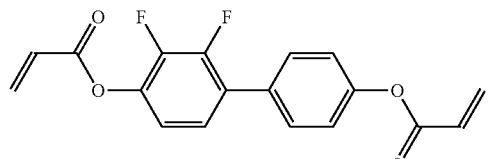

[Chemical Formula 20]

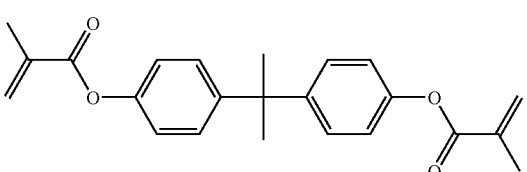

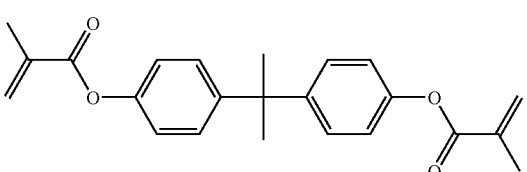

[Chemical Formula 21]

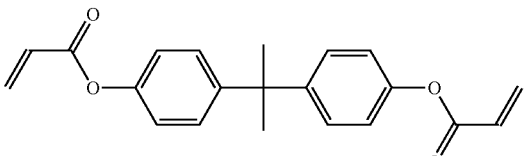

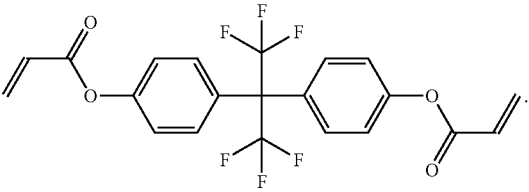

At least one of the first alignment assistant and the second alignment assistant may be contained in an amount between about 0.1 wt. % to about 10 wt. % with respect to the content of the liquid crystal.

The second alignment assistant may be contained in an amount between about 40 wt. % to about 90 wt. % with respect to the content of the total content of the first and the second alignment assistants.

At least one of the first and the second field generating electrodes may include a branch shape.

In an embodiment, at least one of the first and the second alignment assistants may comprise a non-polymerized alignment assistant; and the non-polymerized alignment assistants may be contained in an amount less than or equal to about 5 wt. % with respect to a total content of the first and the second alignment assistants.

In an embodiment, a manufacturing method of a liquid crystal display includes forming a first display panel with a pixel electrode; forming a second display panel with a common electrode; assembling the first display panel and the second display panel; disposing a liquid crystal layer between the first display panel and the second display panel, the liquid crystal layer including a liquid crystal and at least one of a first alignment assistant and a second alignment assistant; applying a voltage between the pixel electrode and the common electrode; and irradiating light on the liquid crystal layer during the application of a voltage between the pixel electrode and the common electrode.

The second alignment assistant may include a mesogen and two or more photo-polymerizable groups.

The mesogen may be selected from the group consisting of a naphthalene group, a biphenyl group, a bisphenol-A group, a fluorine substituted naphthalene group, a fluorine substituted biphenyl group, a fluorine substituted bisphenol-A group, and a combination including at least one of the foregoing groups, and the photo-polymerizable group may be selected from the group consisting of an acrylate group, a methacrylate group, and a combination including at least one of the foregoing groups.

In an embodiment, the first alignment assistant may include a non-mesogen and three or more photo-polymerizable groups, and the second alignment assistant includes a mesogen and two or more photo-polymerizable groups.

In an embodiment, the pixel electrode may include a branch shape.

The method may further include irradiating light on the liquid crystal layer when the voltage between the pixel electrode and the common electrode is not applied.

In an embodiment, at least one of the first alignment assistant and the second alignment assistant comprises a non-polymerized alignment assistant, and the non-polymerized alignment assistant may be contained in an amount less than or equal to about 5 wt. % with respect to the total content of the first and the second alignment assistants.

As above described, the liquid crystal display according to an exemplary embodiment includes an alignment assistant such that a pre-tilt of the liquid crystal may be uniformly controlled, and the alignment assistant includes a selected structure such that a residual content of the non-polymerized alignment assistant, which remains in a liquid crystal layer, may be reduced. Accordingly, an afterimage, which may be caused by the non-polymerized alignment assistant, may be reduced, thereby improving display quality.

BRIEF DESCRIPTION OF THE DRAWINGS

The above and other aspects, advantages, and features of the invention will become more apparent by describing in further detail exemplary embodiments thereof with reference to the attached drawings, in which.

DETAILED DESCRIPTION OF THE INVENTION

Figure 1:
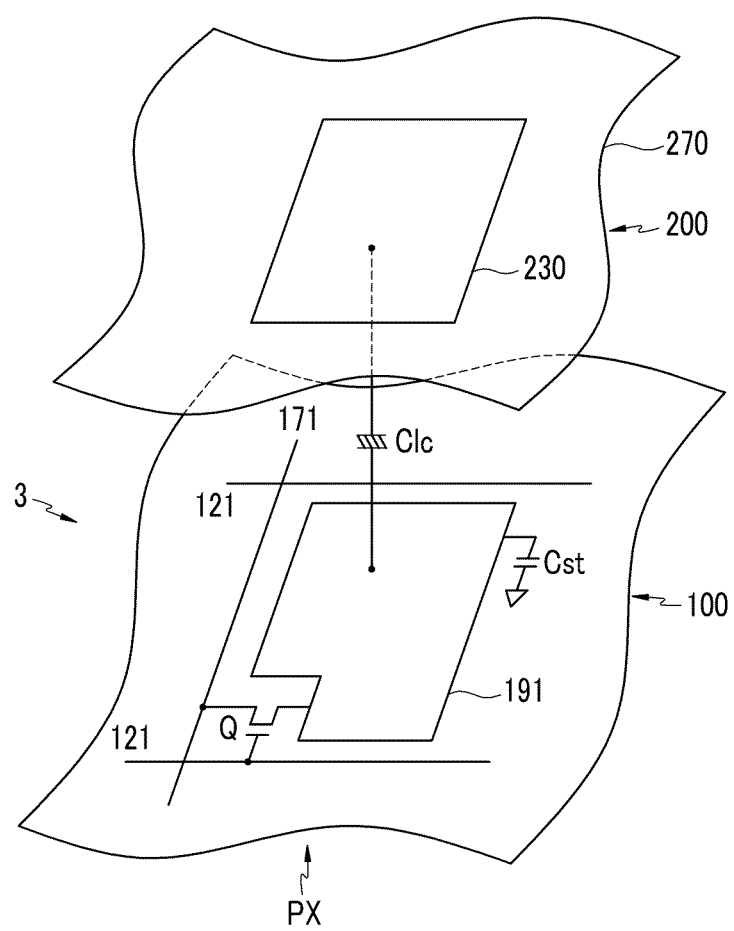
FIG. 1 is an equivalent circuit diagram showing an exemplary embodiment of a pixel in a liquid crystal display.

The invention will be described more fully hereinafter with reference to the accompanying drawings, in which exemplary embodiments are shown. As those skilled in the art would realize, the disclosed embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

As used herein, the term "(meth)acrylate" encompasses both acrylate and methacrylate groups.

As used herein, "alkyl" is intended to include both branched and straight-chain saturated aliphatic hydrocarbon groups, having the specified number of carbon atoms. Thus, the term $C_3$-$C_{12}$alkyl as used herein includes alkyl groups having from about 3 to about 6 carbon atoms.

The term "substituted," as used herein, means that any one or more hydrogens on the designated compound or group is replaced with the indicated atom or group, provided that an atom's normal valence is not exceeded.

The singular forms "a," "an," and "the" include plural referents unless the context clearly dictates otherwise.

As used herein, a mesogen is a group having a valence of two or more and comprising two or more aromatic or aliphatic rings.

As used herein, a non-mesogen is an acyclic group having a valence of two or more, thus a non-mesogen does not include an aromatic or aliphatic ring.

A liquid crystal display according to an exemplary embodiment is described with reference to FIG. 1 to FIG. 4.

Figure 2:
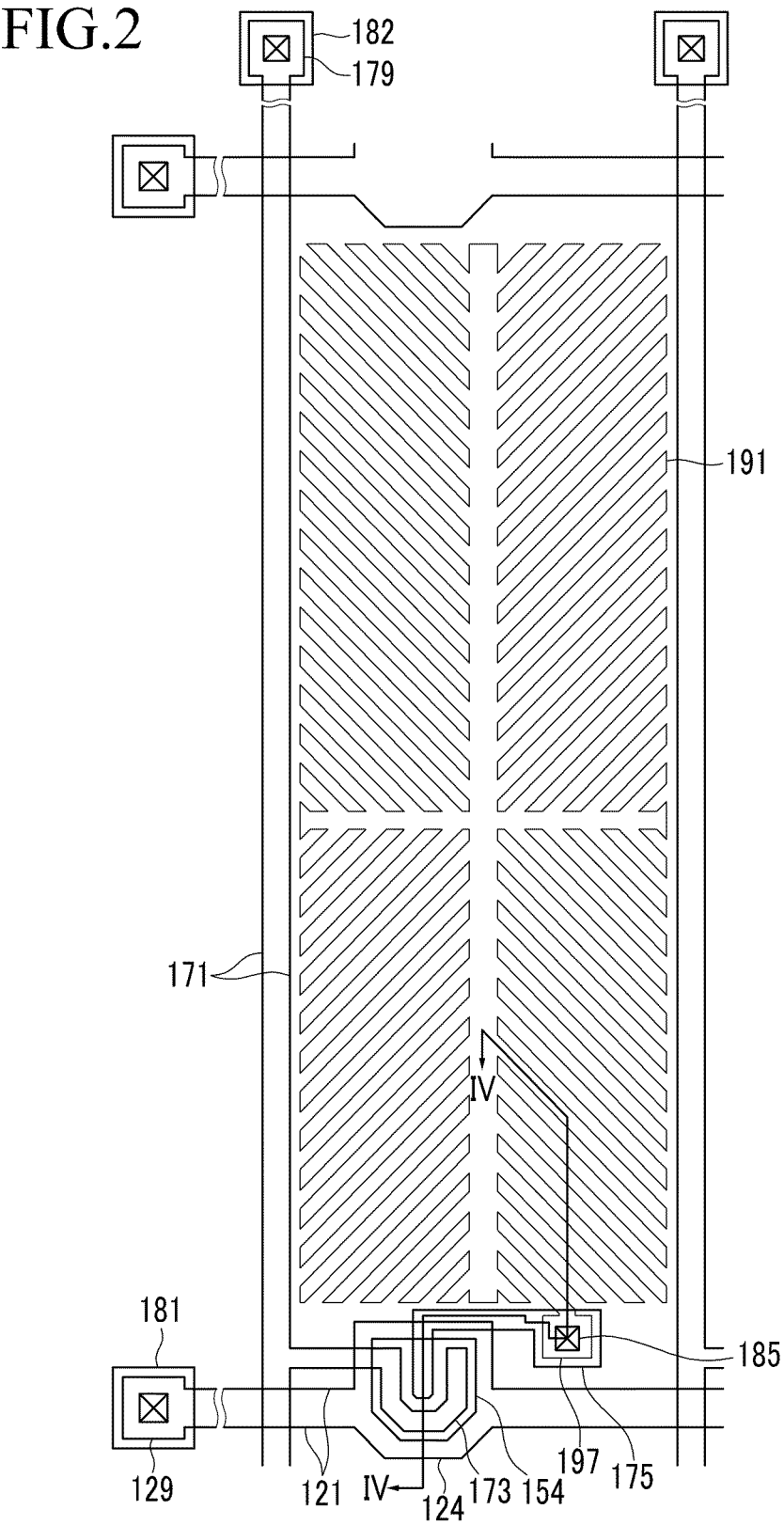
FIG. 2 is a plan view showing an exemplary embodiment of a liquid crystal display.
Figure 3:
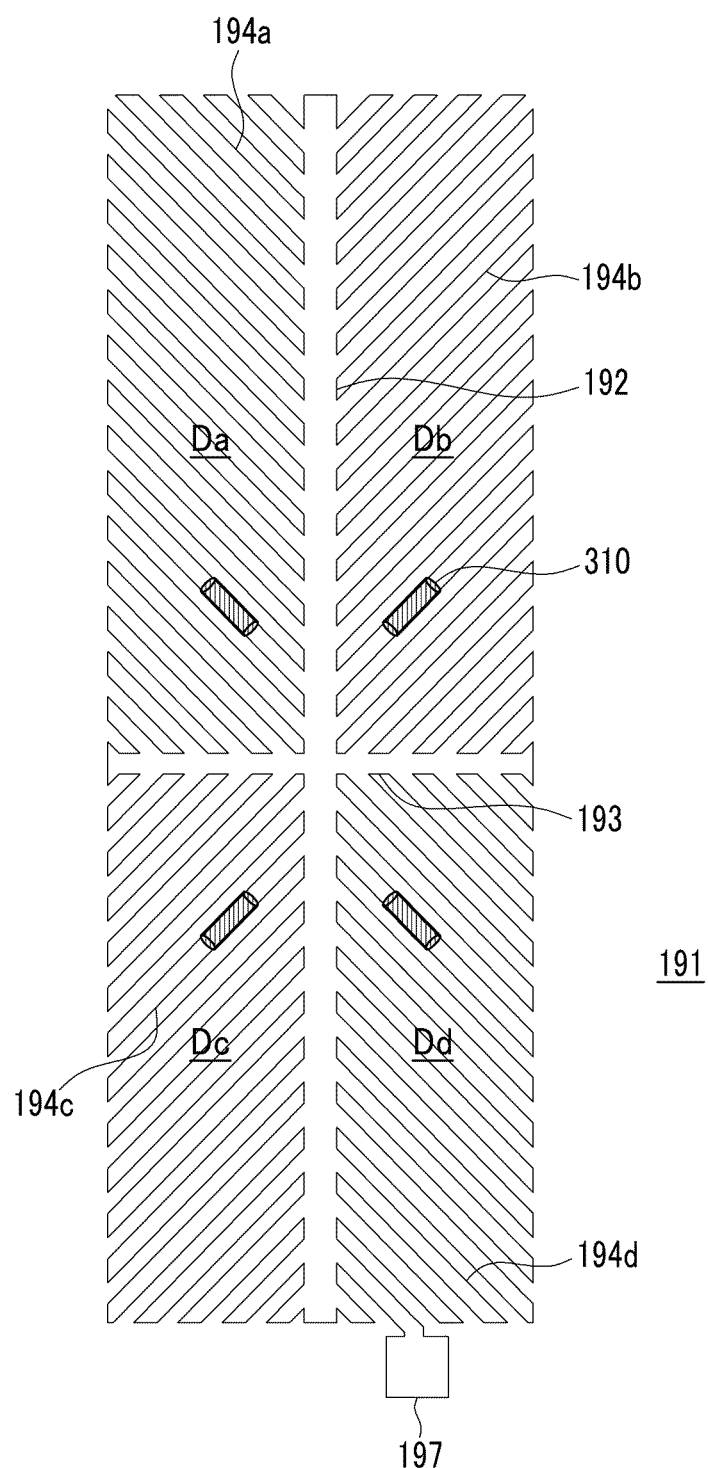
FIG. 3 is a plan view showing an exemplary embodiment of a pixel electrode of the liquid crystal display shown in FIG. 2.
Figure 4:
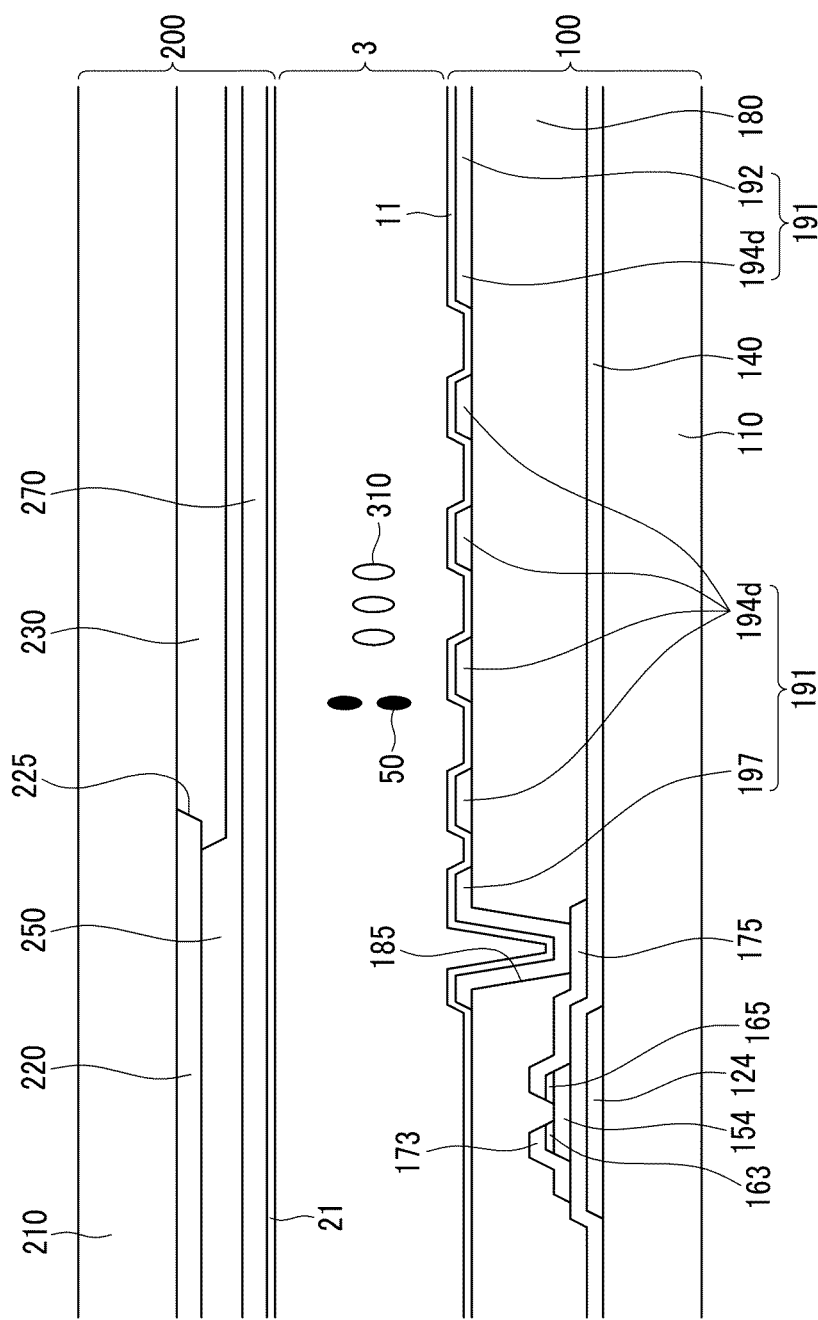
FIG. 4 is a cross-sectional view showing an exemplary embodiment of the liquid crystal display shown in FIG. 2 taken along line IV-IV.

FIG. 1 is an equivalent circuit diagram showing an exemplary embodiment of a pixel of a liquid crystal display, FIG. 2 is a plan view showing an exemplary embodiment of a liquid crystal display, FIG. 3 is a plan view showing an exemplary embodiment of a pixel electrode of the liquid crystal display shown in FIG. 2, and FIG. 4 is a cross-sectional view showing an exemplary embodiment of the liquid crystal display shown in FIG. 2 taken along line IV-IV.

Referring to FIG. 1, a liquid crystal display includes a thin film transistor array panel 100 and a common electrode panel 200 facing each other, and a liquid crystal layer 3 interposed between the thin film transistor array panel 100 and the common electrode panel 200.

The thin film transistor array panel 100 includes a gate line 121 for transmitting a gate signal and a data line 171 for transmitting a data voltage. The gate lines 121 are substantially parallel to each other and may extend in a row direction, and the data lines 171 are substantially parallel to each other and may extend in a column direction.

Each pixel PX includes a switching element Q electrically connected to a gate line 121 and a data line 171, and a liquid crystal capacitor Clc and a storage capacitor Cst electrically connected thereto.

The liquid crystal capacitor Clc is disposed between a pixel electrode 191 of the thin film transistor array panel 100 and a common electrode 270 of the common electrode panel 200, and the liquid crystal layer 3, which is disposed between the pixel electrode 191 and the common electrode 270, functions as a dielectric material.

The storage capacitor Cst, serving as an assistant to the liquid crystal capacitor Clc, is disposed as a separate signal line (not shown) on the thin film transistor array panel 100. The pixel electrode 191 and the storage capacitor Cst may overlap, an insulator may be interposed therebetween, and a selected voltage, such as a common voltage Vcom, may be applied thereto. The storage capacitor Cst may be omitted if desirable.

In an embodiment, the pixel may include a color filter 230 for display of a color. The color filter 230 may be disposed on the common electrode panel 200, but it is not limited thereto, and the color filter 230 may be disposed on the thin film transistor array panel 100.

The liquid crystal display according to an exemplary embodiment is described in further detail with reference to FIG. 2 to FIG. 4.

First, the thin film transistor array panel 100 is described.

A gate line 121, including a gate electrode 124, which may extend in an upward and a downward direction, and an end portion 129 for connection with an external circuit, is disposed on an insulating substrate 110.

A gate insulating layer 140 is disposed on the gate line 121, and a semiconductor 154 comprising hydrogenated amorphous silicon, polysilicon, or the like, or a combination comprising at least one of the foregoing materials, is disposed on the gate insulating layer 140.

A first and a second of ohmic contacts 163 and 165 are disposed on the semiconductor 154. The first and the second ohmic contacts 163 and 165 may comprise a material such as n+ hydrogenated amorphous silicon, in which an n-type impurity such as phosphorus, or the like, is doped at a high concentration, a silicide, or the like, or a combination comprising at least one of the foregoing materials.

A data line 171 and a drain electrode 175 are disposed on the first and the second ohmic contacts 163 and 165, and on the gate insulating layer 140.

The data line 171 may be perpendicular to the gate line 121 and include a source electrode 173, which may be disposed in a "U" shape oriented towards the gate electrode 124, and a second end portion 179, for electrical connection to an external circuit.

The drain electrode 175 includes a first portion within the source electrode 173 having a first width, and a second portion extending therefrom having a second width, wherein the first width is less than the second width.

A thin film transistor ("TFT") Q comprises a gate electrode 124, a source electrode 173, a drain electrode 175, and a semiconductor 154, and a channel of the TFT Q is disposed on the semiconductor 154 between the source electrode 173 and the drain electrode 175.

A passivation layer 180 is disposed on the data line 171, the drain electrode 175, and the exposed semiconductor 154. The passivation layer 180 comprises a first and a second contact holes 185 and 182 exposing the drain electrode 175 and the second end portion 179, respectively, of the data line 171, and the passivation layer 180 and the gate insulating layer 140 comprise a third contact hole 181 exposing the first end portion 129 of the gate line 121.

A pixel electrode 191, comprising a transparent conductive material, such as indium tin oxide ("ITO"), indium zinc oxide ("IZO"), or the like, or a reflective metal such as aluminum, silver, chromium, alloys thereof, or the like, or a combination comprising at least one of the foregoing materials, is disposed on the passivation layer 180.

The pixel electrode 191 may comprise a rectangular shape, and the pixel electrode 191 may include a transverse stem 193, a longitudinal stem 192 intersecting the transverse stem 193, a first, a second, a third, and a fourth branches 194a, 194b, 194c, and 194d obliquely extending from the transverse stem 193 and the longitudinal stem 192, and a lower protrusion 197.

Also, the pixel electrode 191 may be divided into a first sub-region Da, a second sub-region Db, a third sub-region Dc, and a fourth sub-region Dd by the transverse stem 193 and the longitudinal stem 192. The sub-regions Da, Db, Dc, and Dd respectively include the first, the second, the third, and the fourth branches 194a, 194b, 194c, and 194d, and the four sub-regions Da, Db, Dc, and -Dd may form a display unit for transmitting light.

The first branch 194a may obliquely extend from the transverse stem 193 or the longitudinal stem 192 in an upper-left direction, and the second branch 194b may obliquely extend from the transverse stem 193 or the longitudinal stem 192 in an upper-right direction. Also, the third branch 194c may obliquely extend from the transverse stem 193 or the longitudinal stem 192 in a lower-left direction, and the fourth branch 194d may obliquely extend from the transverse stem 193 or the longitudinal stem 192 in a lower-right direction.

The first, the second, the third, and the fourth branches 194a, 194b, 194c, and 194d may form an angle of about 45 degrees or about 135 degrees with the gate line 121 or the transverse stem 193. Also, the branches 194a, 194b, 194c, and 194d of two neighboring sub-regions Da, Db, Dc, and Dd may be perpendicular to each other.

The lower protrusion 197 of the pixel electrode 191 is physically and electrically connected to the drain electrode 175 through the first contact hole 185, and receives a data voltage from the drain electrode 175.

Next, the common electrode panel 200 is described.

A light blocking member 220 is formed on an insulation substrate 210. The light blocking member 220 prevents light leakage between the pixel electrodes 191 and includes an opening 225, which defines a region facing the pixel electrodes 191.

A color filter 230 may be disposed on the substrate 210 and the light blocking member 220. The color filter 230 may be disposed in a region enclosed by the light blocking member 220, and may extend to correspond to a column comprising a plurality of pixel electrodes 191. A color filter 230 may display one of the primary colors, such as the colors red, green, or blue.

An overcoat 250 may be disposed on the color filter 230 and the light blocking member 220, and a common electrode 270 comprising a transparent conductor, such as ITO, IZO, or the like, or a combination comprising at least one of the foregoing transparent conductors, is disposed on substantially an entire surface of the overcoat 250.

A first and a second alignment layers 11 and 21 are disposed on an inner surface of the thin film transistor array panel 100 and the common electrode panel 200, and may be a vertical alignment layer.

A polarizer (not shown) may be disposed on at least one of an outer surface of the thin film transistor array 100 and an outer surface of a common electrode panel 200.

A liquid crystal layer 3 is disposed between the thin film transistor array panel 100 and the common electrode panel 200. The liquid crystal layer 3 includes a liquid crystal 310 and an alignment assistant 50.

The liquid crystal 310 may have a negative dielectric anisotropy, and may be oriented such that a major axis of the liquid crystal 310 is substantially perpendicular to a surface of the thin film transistor array panel 100 and the common electrode panel 200 when no electric field is applied.

If a voltage is applied between the pixel electrode 191 and the common electrode 270, the liquid crystal 310 rearranges in response to the electric field such that a direction of the major axis thereof changes to be substantially perpendicular to a direction of the electric field. The liquid crystal may change an angle of polarization of light incident on the liquid crystal layer 3 depending on a degree of inclination of the liquid crystal 310. Also, a change in the angle of polarization of light may be observed by a change in a transmittance of light when a polarizer is used. Accordingly, a liquid crystal display may display an image.

The orientation of the liquid crystal 310 may be controlled by the branches 194a, 194b, 194c, and 194d of the pixel electrode 191, and the liquid crystal 310 may be inclined parallel to a length direction of the branches 194a, 194b, 194c, and 194d. A pixel electrode 191 may include the four sub-regions Da, Db, Dc, and Dd, each comprising the a branch 194a, 194b, 194c, and 194d, respectively, of the different length directions such that an inclined direction of the liquid crystal 310 comprises all four directions, and the four sub-regions, include the different alignment directions of the liquid crystal 310, are disposed in the liquid crystal layer 3. Therefore, a viewing angle of the liquid crystal display is widened by varying the inclined direction of the liquid crystal.

The alignment assistant 50 may function to control a pre-tilt during an initial alignment of the liquid crystal 310.

The alignment assistant 50 may comprise a structure which is similar to a liquid crystal structure, and thus may include a core group, comprising a core axis, and a terminal group connected thereto.

The alignment assistant 50, according to an exemplary embodiment, includes a mesogen, as a core group, substituted by two or more photo-polymerizable groups, which are a terminal group.

The mesogen is a substituted or unsubstituted group comprising two or more aromatic or aliphatic rings. Exemplary mesogens include at least one group selected from the group consisting of a substituted or unsubstituted naphthalene, such as the group represented by Chemical Formula A, a substituted or unsubstituted biphenyl group, such as the group represented by Chemical Formula B, a substituted or unsubstituted bisphenol-A group, such as the group represented by Chemical Formula C, a fluorine substituted biphenyl group, such as the group represented by Chemical Formula D, a fluorine substituted bisphenol-A group, such as the group represented by Chemical Formula E, and the like, and a combination comprising at least one of the foregoing mesogens. In an embodiment, the mesogen is symmetric across one, two, or three mirror planes.

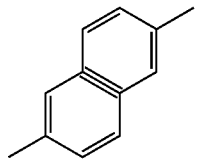

[Chemical Formula A]

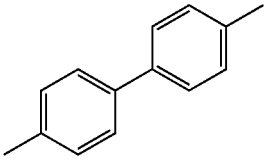

[Chemical Formula B]

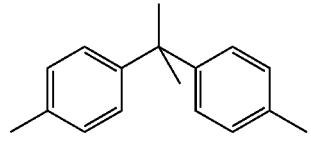

[Chemical Formula C]

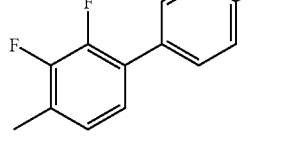

[Chemical Formula D]

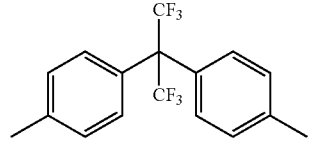

[Chemical Formula E]

The photo-polymerizable group is a functional group which may be polymerized by light, but is not limited thereto. Exemplary photo-polymerizable groups include an acrylate group, such as the group represented by Chemical Formula F, and a methacrylate group, such as the group represented by Chemical Formula G, or the like, or a combination comprising at least one of the foregoing photo-polymerizable groups.

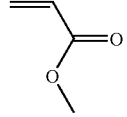

[Chemical Formula F]

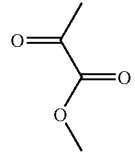

[Chemical Formula G]

Also, the alignment assistant 50 may further include a substituted or unsubstituted alkyl group disposed between the mesogen and the photo-polymerizable group. In an embodiment, the alkyl group is unsubstituted. In an embodiment, the alkyl group is a $C_1$-$C_6$ alkyl group, a $C_3$-$C_{12}$ alkyl group, or a $C_7$-$C_{12}$ alkyl group. The alkyl group may be disposed between the mesogen and the photo-polymerizable group, and the length of the alkyl group may be selected such that a degree of polymerization is increased when light is disposed on the alignment assistant.
The alignment assistant 50 may include at least one compound selected from the compounds represented by Chemical Formulas 1 to 4.
[Chemical Formula 1]
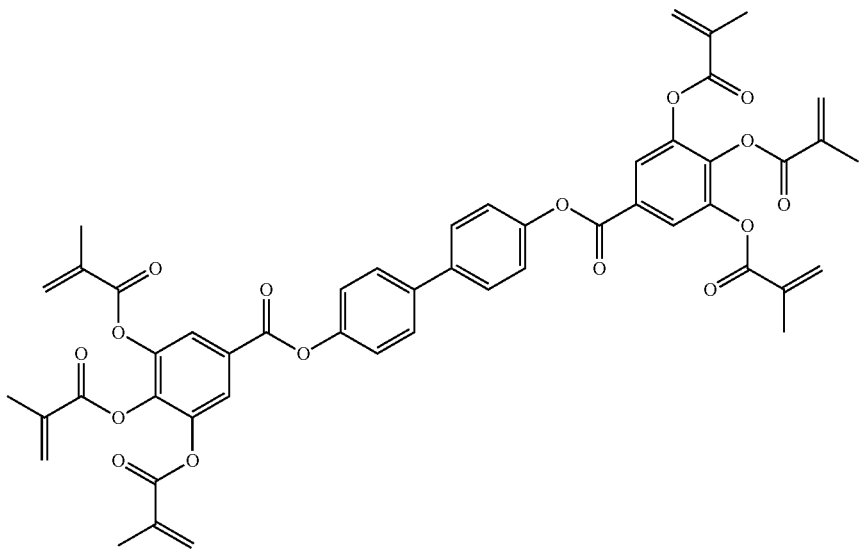
[Chemical Formula 2]
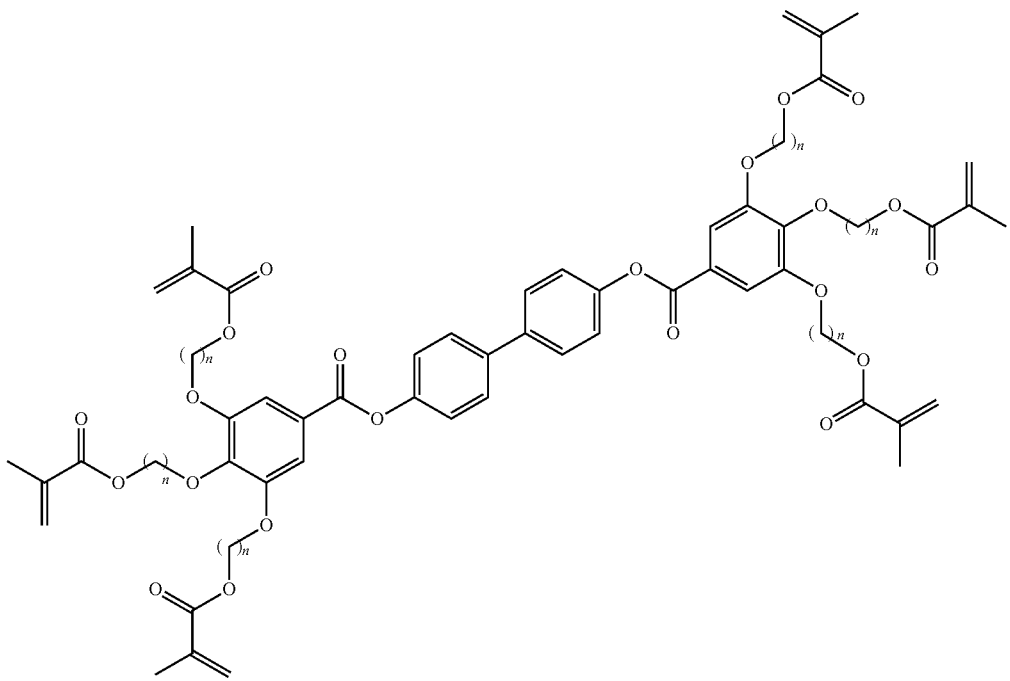

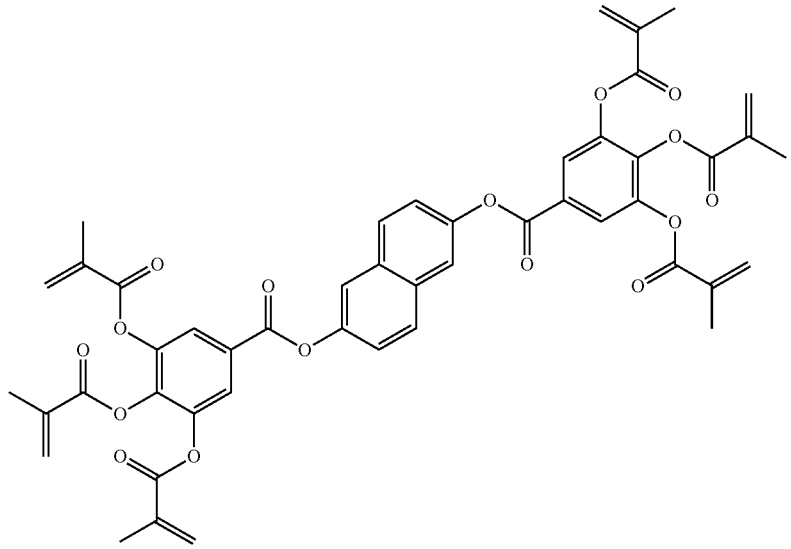

[Chemical Formula 3]

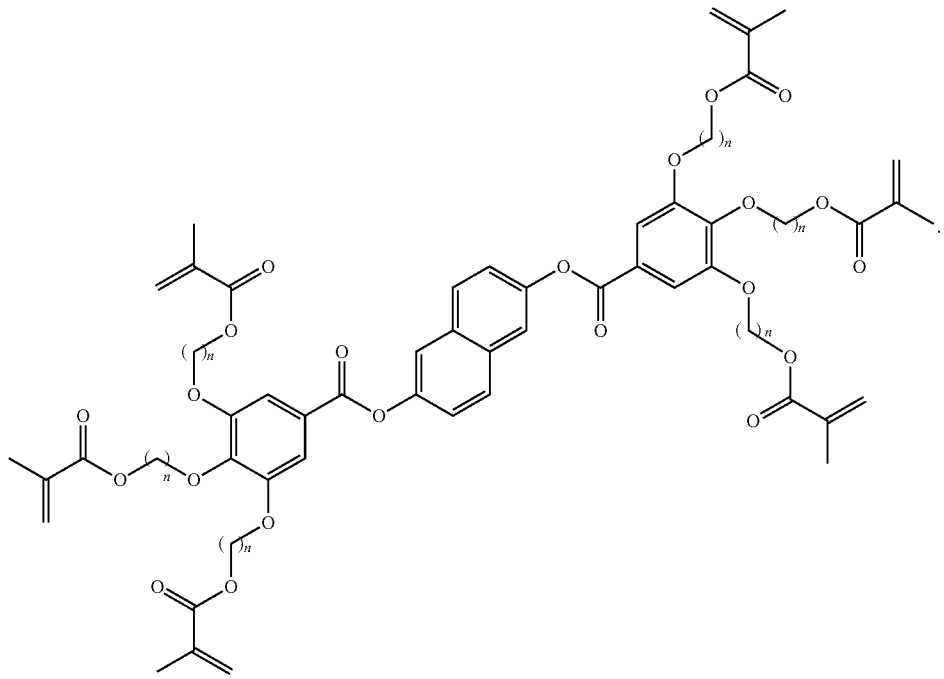

[Chemical Formula 4]

In Chemical Formula 1, the mesogen includes a biphenyl group, the photo-polymerizable group includes a methacrylate group, and the number of photo-polymerizable groups is 6.

In Chemical Formula 2, the mesogen includes the biphenyl group, the photo-polymerizable group includes a methacrylate group, and an alkyl group is disposed between the mesogen and the photo-polymerizable group. The alkyl group may be a $C_3$-$C_{12}$ alkyl group, thus n in Chemical Formula 2 may be about 3 to about 12. The number of photo-polymerizable groups in Chemical Formula 2 is 6.

In Chemical Formula 3, the mesogen includes a naphthalene group, the photo-polymerizable group includes a methacrylate group, and the number of photo-polymerizable groups is 6.

In Chemical Formula 4, the mesogen includes a naphthalene group, the photo-polymerizable group is a methacrylate group, and an alkyl group is disposed between the mesogen and the photo-polymerizable group. The alkyl group may be a $C_3$-$C_{12}$ alkyl group, thus n in Chemical Formula 4 may be about 3 to about 12. In Chemical Formula 4 the number of photo-polymerizable groups is 6.

The compound represented by Chemical Formula 1 may be prepared by the method of Reaction Formula 1.

[Reaction Formula 1]
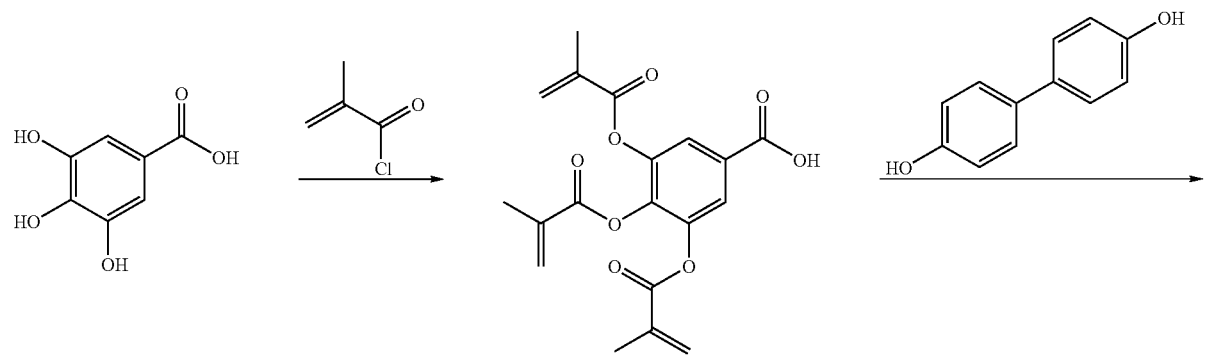
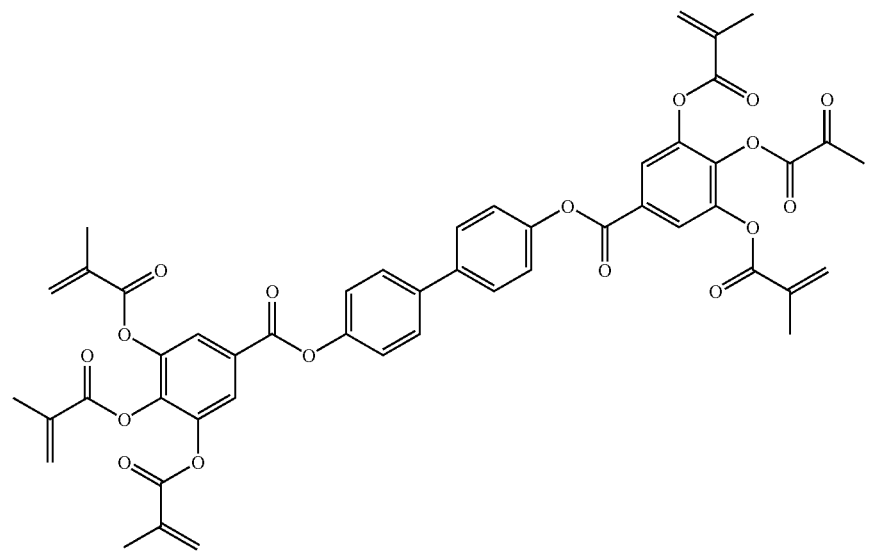
The compound represented by Chemical Formula 2 may be prepared by the method of Reaction Formula 2.
[Reaction Formula 2]
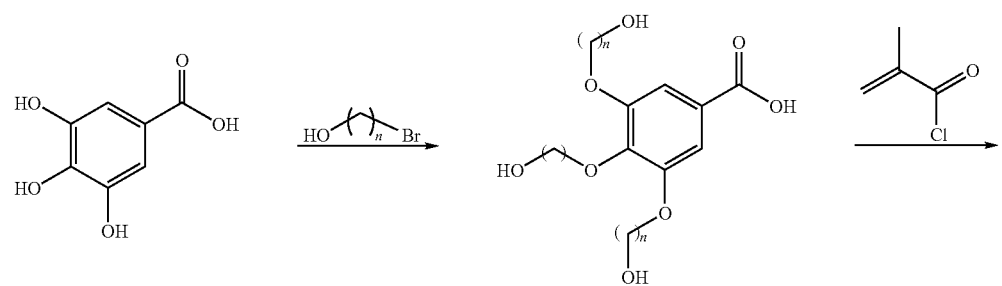

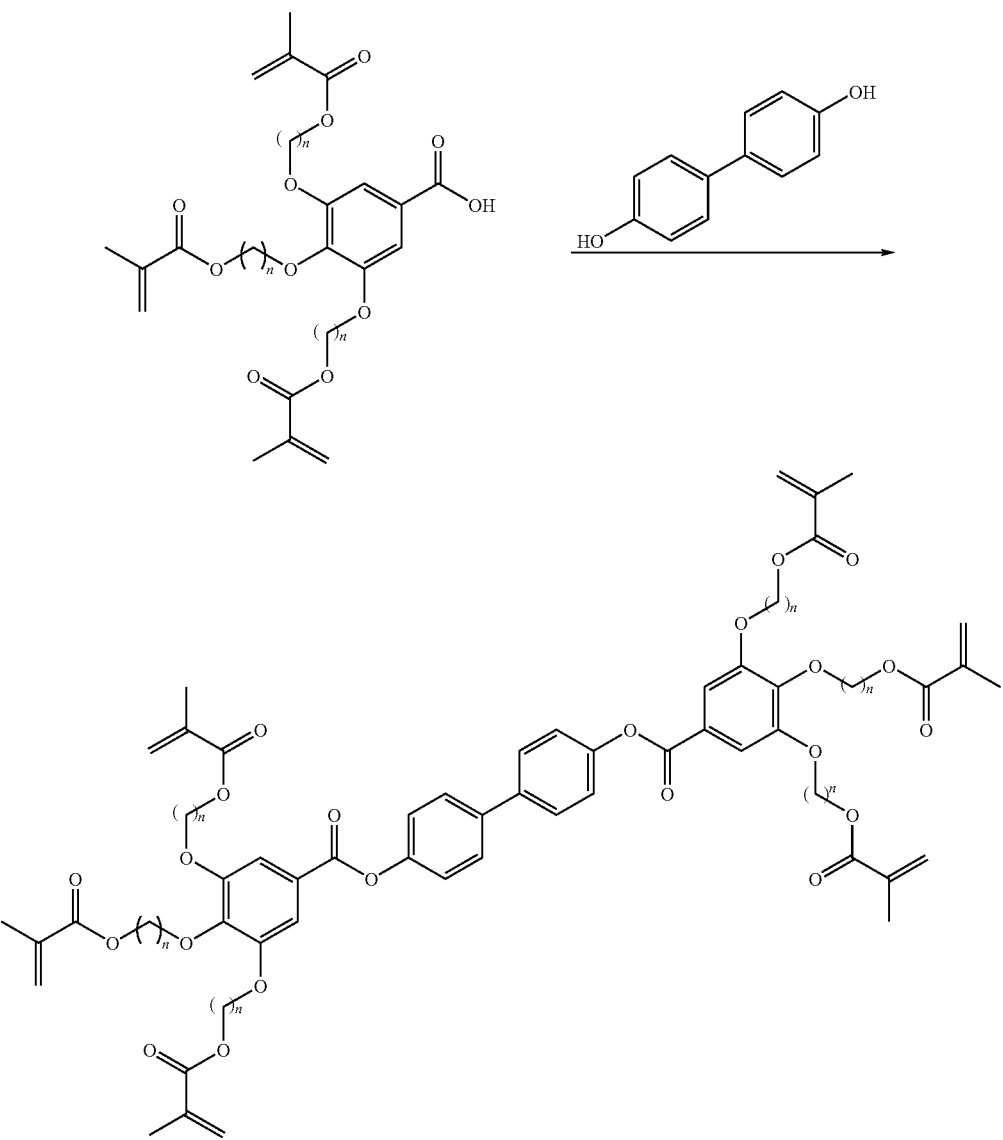
The compound represented by Chemical Formula 3 may be prepared by the method of Reaction Formula 3.
[Reaction Formula 3]
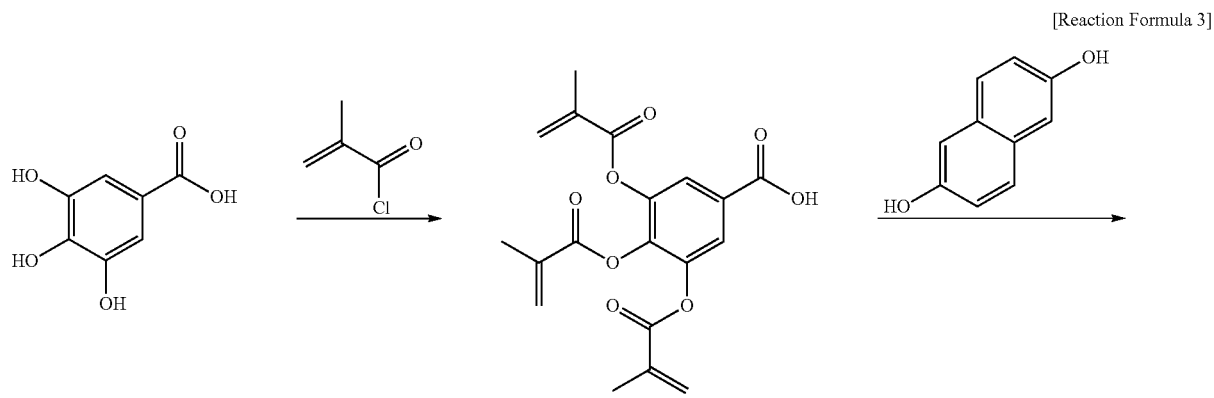

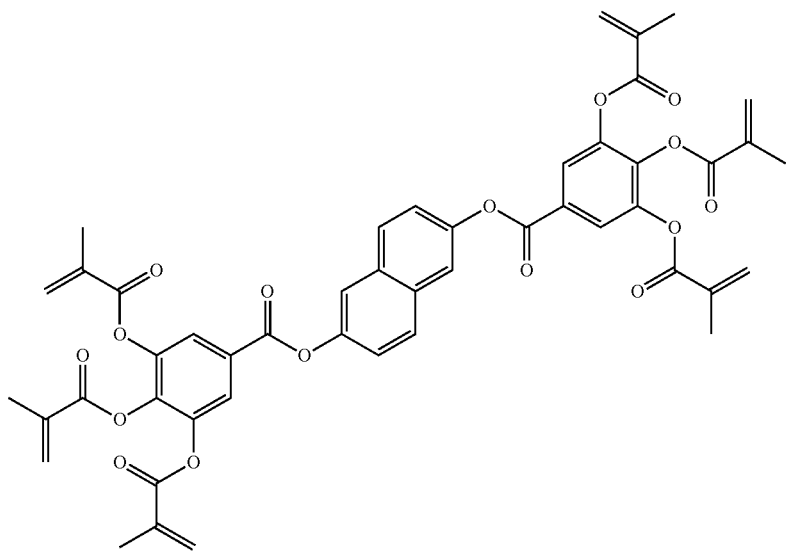
The compound represented by Chemical Formula 4 may be prepared by the method of Reaction Formula 4.
[Reaction Formula 4]
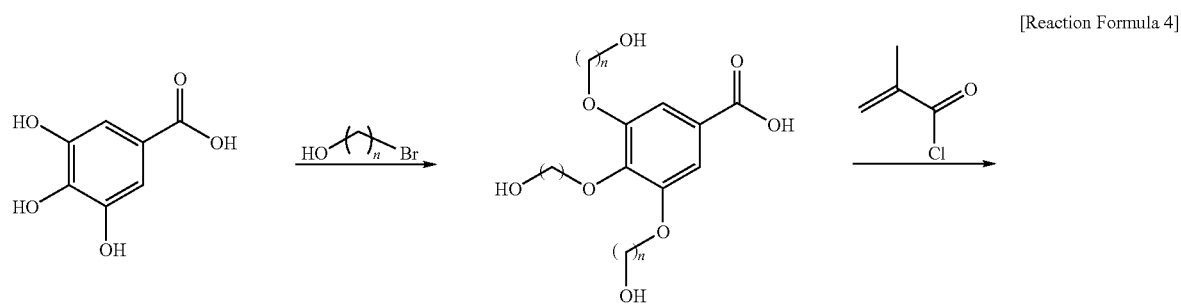
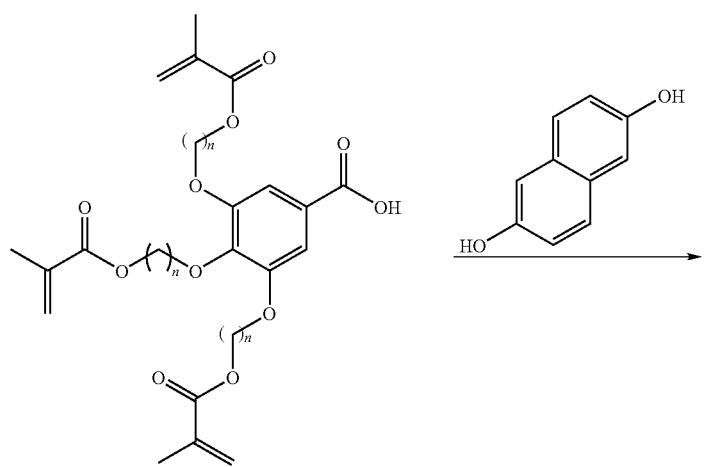

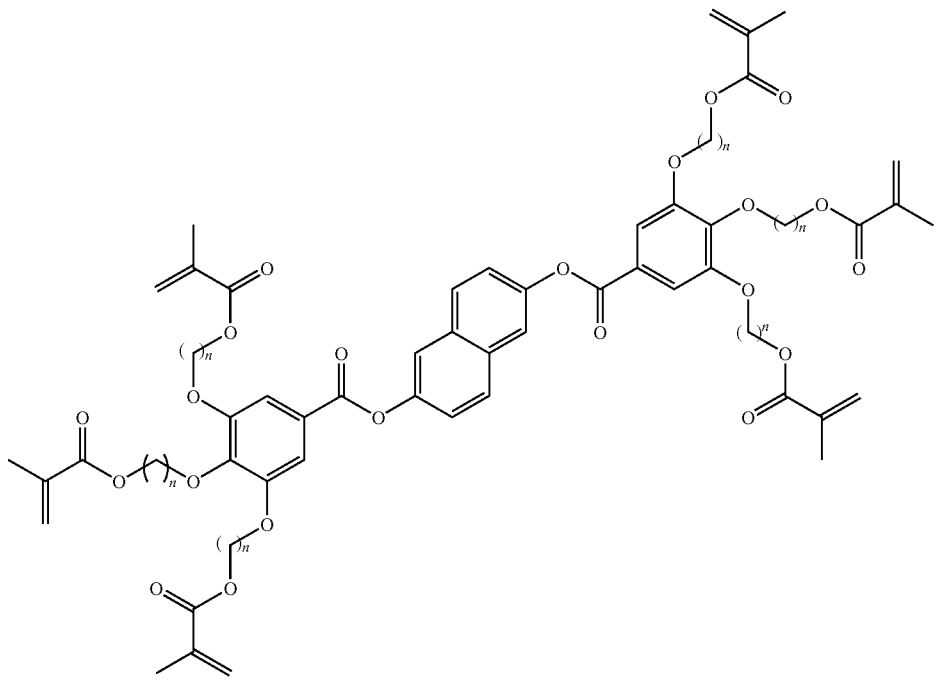

The alignment assistant may be contained in an amount between about 0.1 weight percent (wt. %) to about 10 wt. % with respect to the content of the liquid crystal. When the alignment assistant is contained in an amount less than about 0.1 wt. %, it may be difficult to control a pre-tilt of the liquid crystal, and when the alignment assistant in contained in an amount greater than about 10 wt. %, the content of the liquid crystal may be reduced, thereby deteriorating the a display characteristic.

The liquid crystal layer, according to another exemplary embodiment may comprise a first alignment assistant and a second alignment assistant, wherein the first alignment assistant comprises a non-mesogen and the second alignment assistant comprises a mesogen.

The mesogen may be bonded to two or more photo-polymerizable groups, and the non-mesogen may be bonded to three or more photo-polymerizable groups.

A non-mesogen is acyclic, thus does not include an aromatic or aliphatic ring. A mesogen is cyclic, and comprises two or more aromatic or aliphatic rings.

The non-mesogen may function as a cross-linker for improving a reaction probability to facilitate polymerization by light.

An alignment assistant comprising a non-mesogen may include at least one compound selected from the group represented by Chemical Formulas 5 to 10.

[Chemical Formula 5]

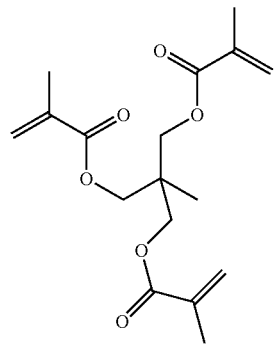

[Chemical Formula 6]

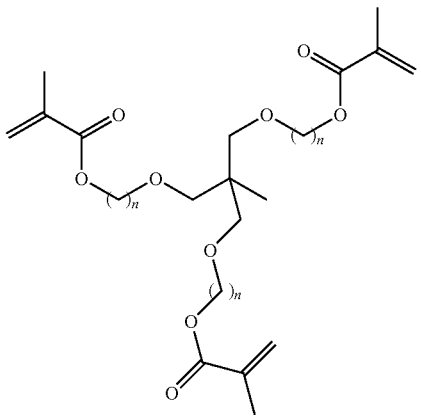

[Chemical Formula 7]
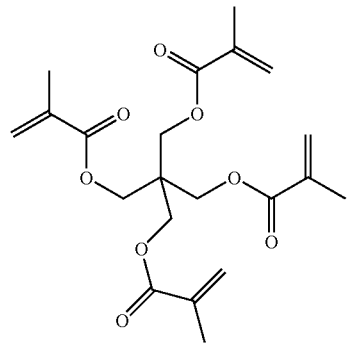
[Chemical Formula 8]
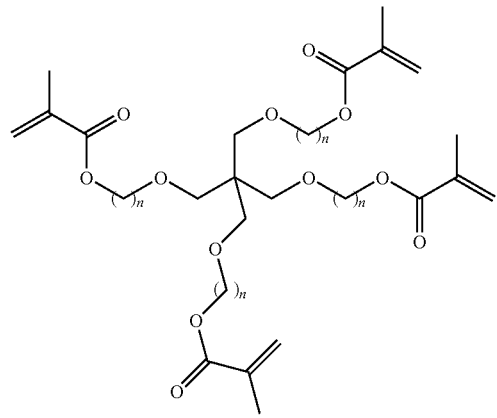
[Chemical Formula 9]
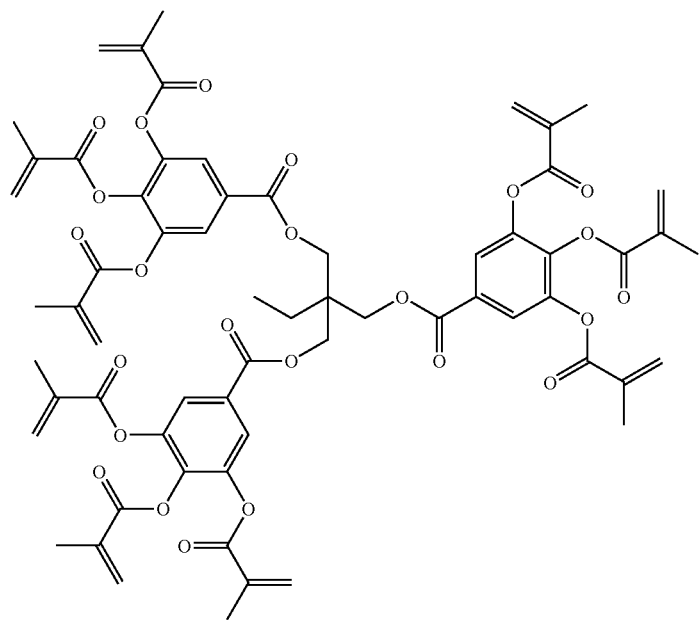
[Chemical Formula 10]
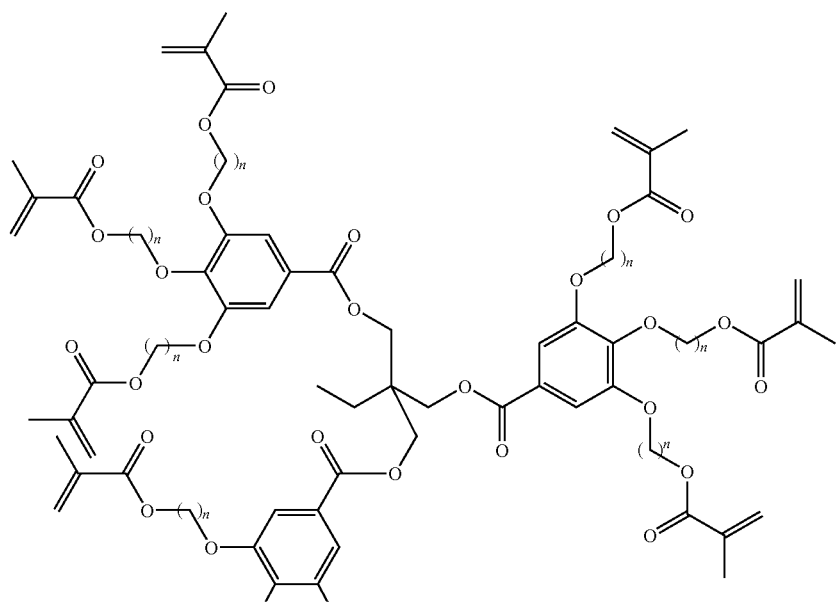

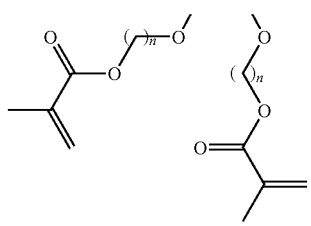

The compound represented by Chemical Formula 5 may be manufactured by the method of Reaction Formula 5.

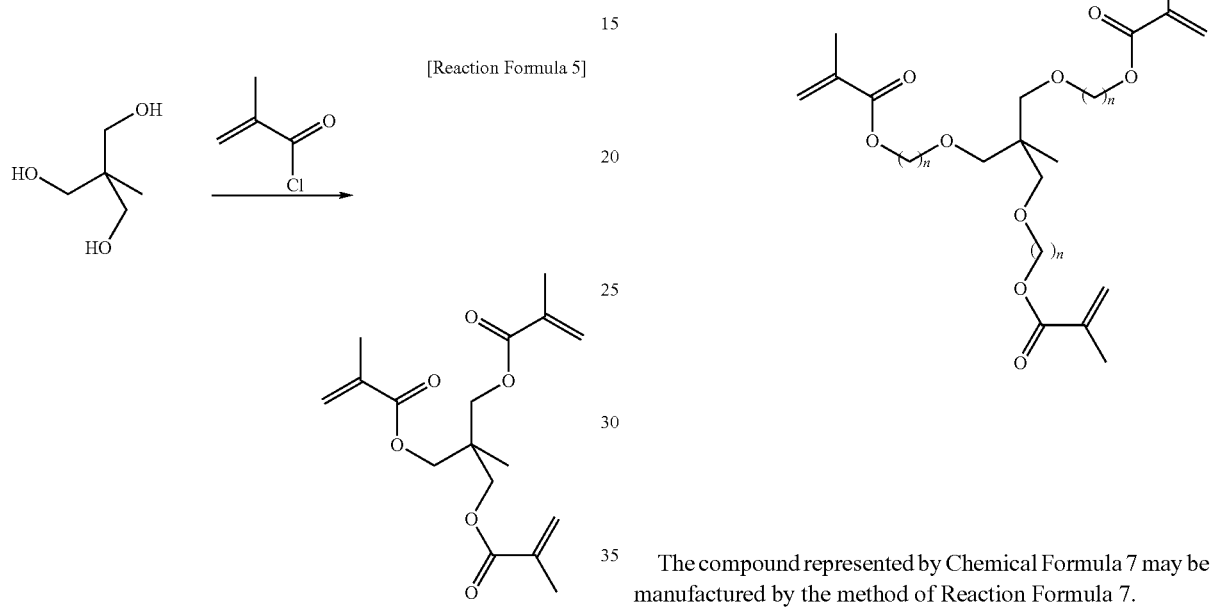

[Reaction Formula 5]

The compound represented by Chemical Formula 6 may be manufactured by the method of Reaction Formula 6.

[Reaction Formula 6]

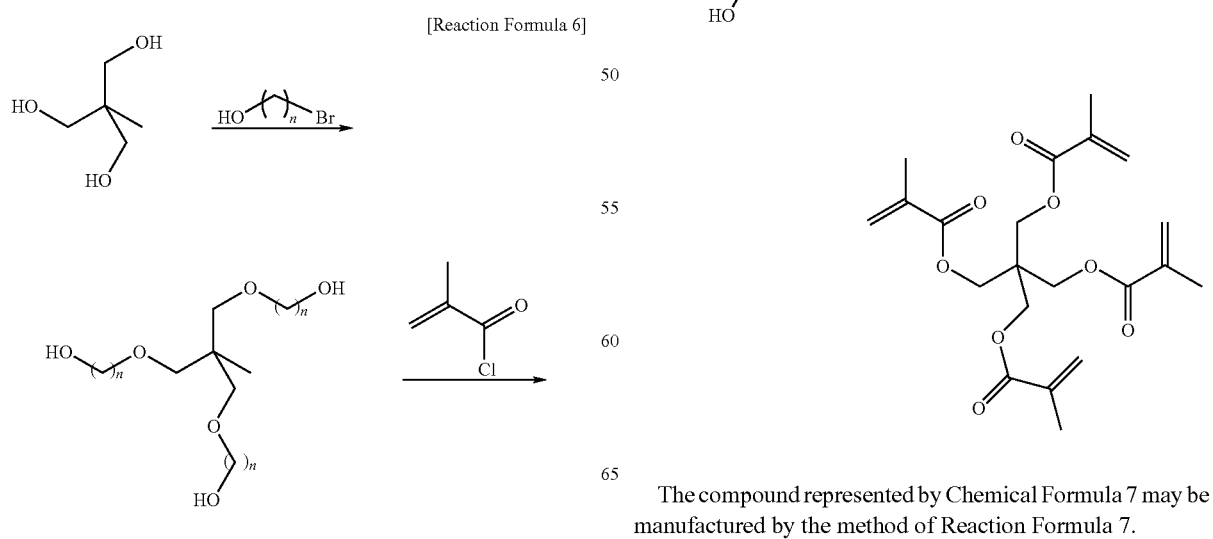

The compound represented by Chemical Formula 7 may be manufactured by the method of Reaction Formula 7.

[Reaction Formula 7]

The compound represented by Chemical Formula 7 may be manufactured by the method of Reaction Formula 7.

[Reaction Formula 8]
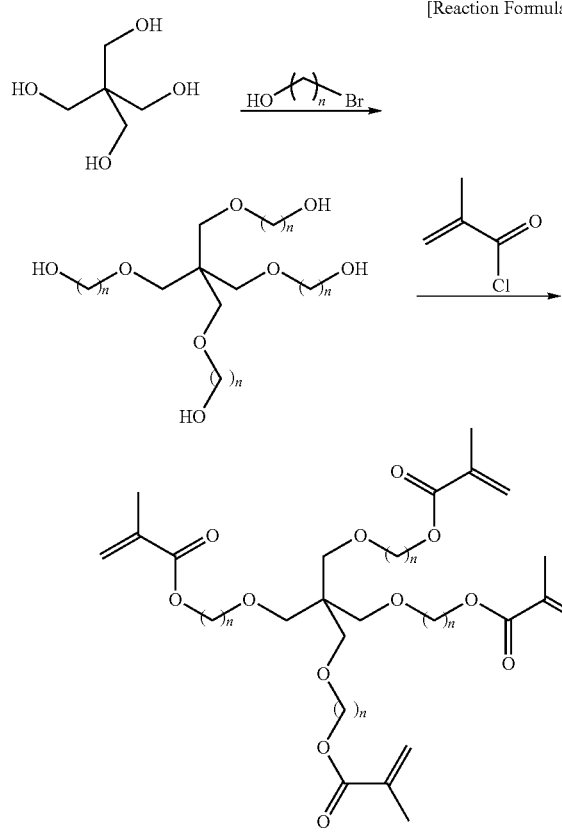
The compound represented by Chemical Formula 9 may be manufactured by the method of Reaction Formula 9.
[Reaction Formula 9]
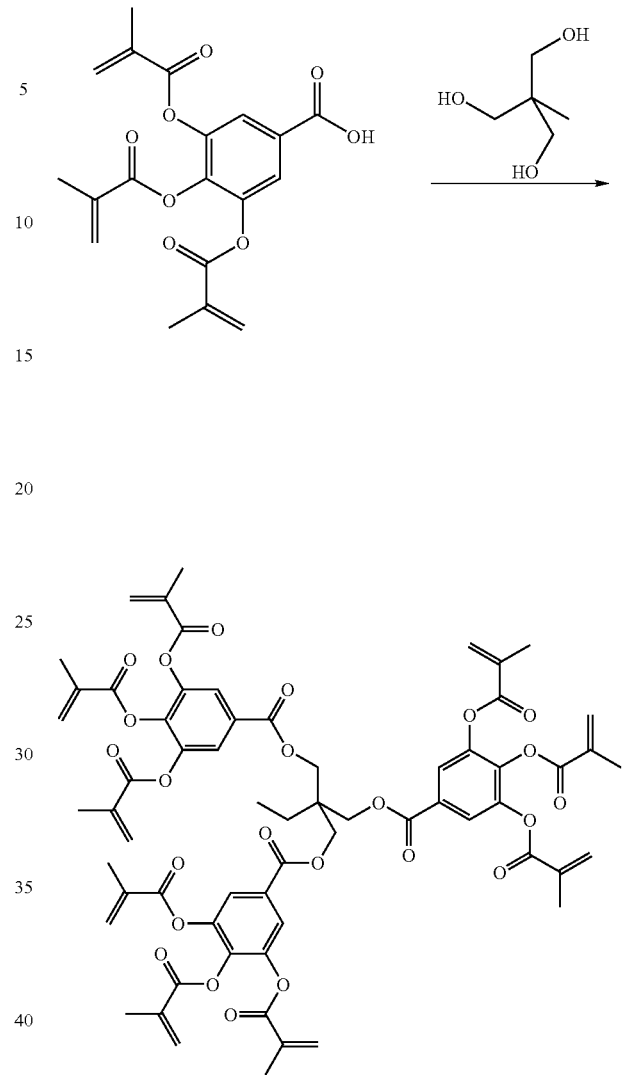
The compound represented by Chemical Formula 10 may be manufactured by the method of Reaction Formula 10.
[Reaction Formula 10]
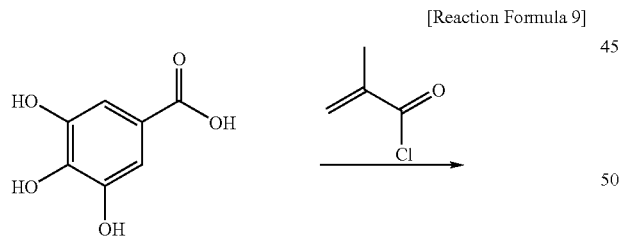
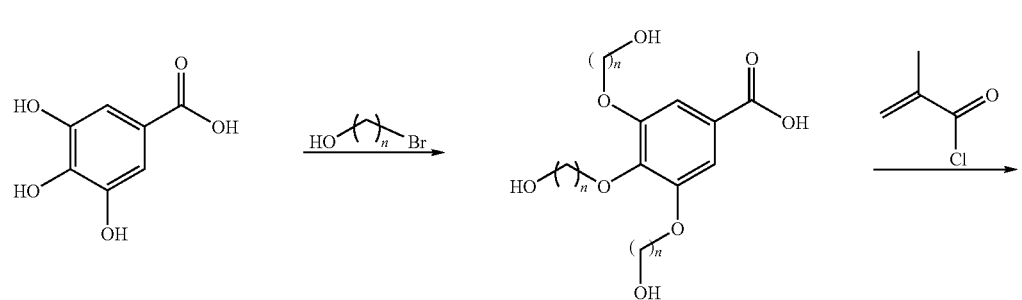

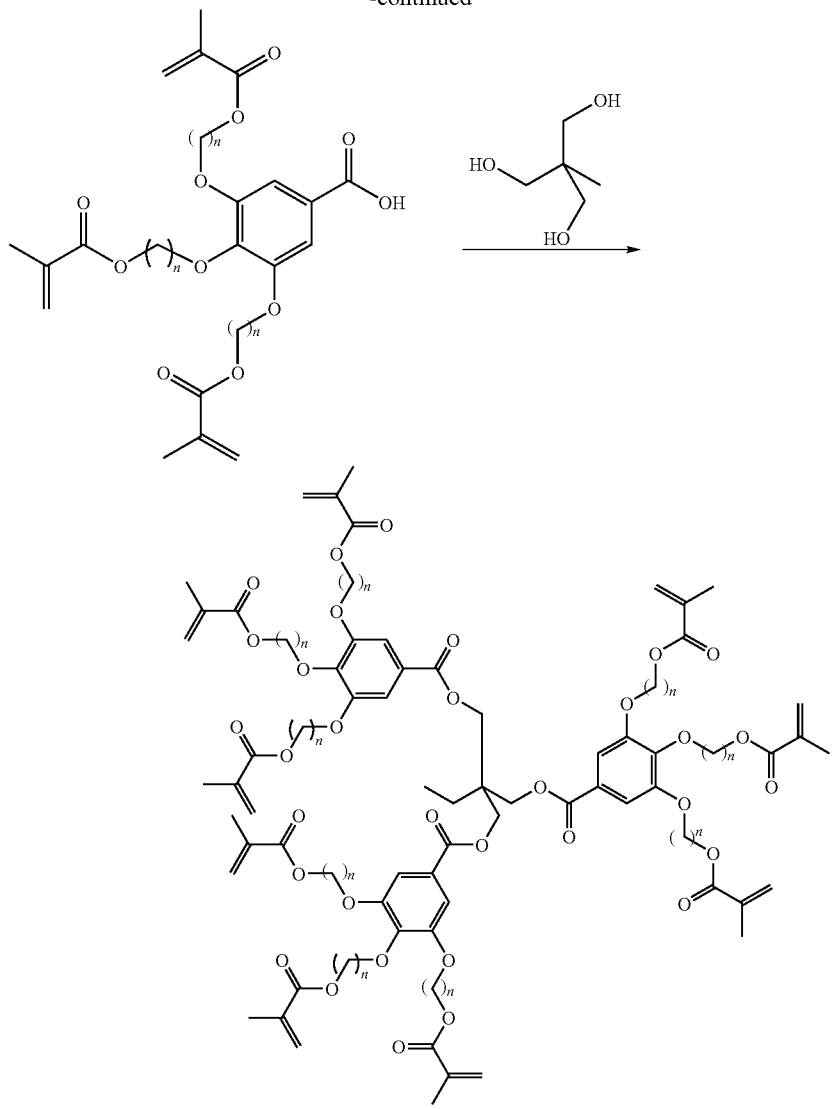
An alignment assistant comprising a mesogen may include at least one compound selected from the group represented by the above-described Chemical Formulas 1 to 4 and by Chemical Formulas 11 to 21 below.
[Chemical Formula 11]
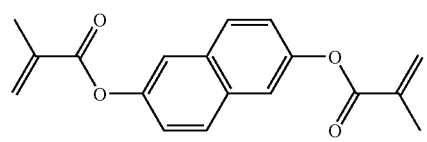
[Chemical Formula 12]
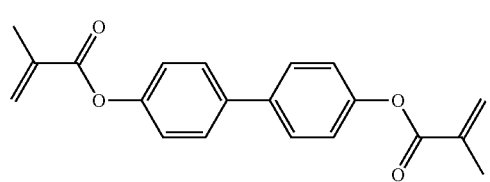
-continued
[Chemical Formula 13]
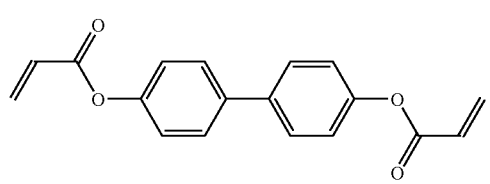
[Chemical Formula 14]
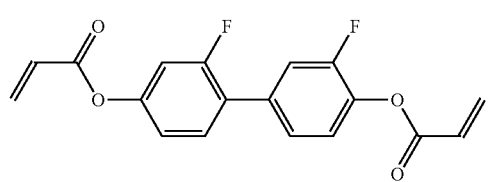

-continued

[Chemical Formula 15]

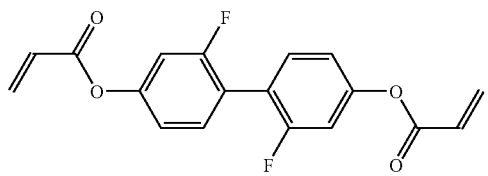

[Chemical Formula 16]

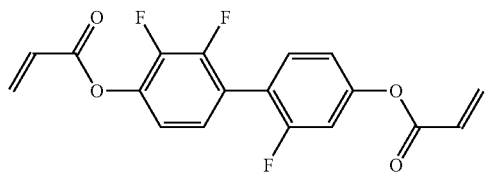

[Chemical Formula 17]

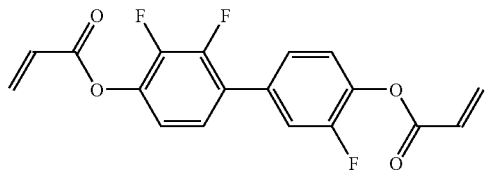

[Chemical Formula 18]

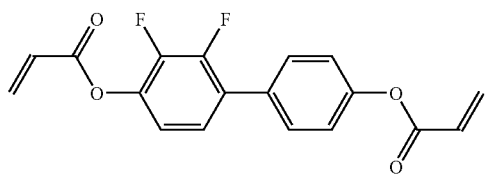

[Chemical Formula 19]

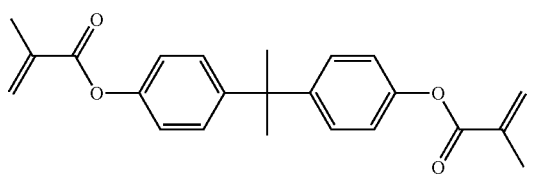

[Chemical Formula 20]

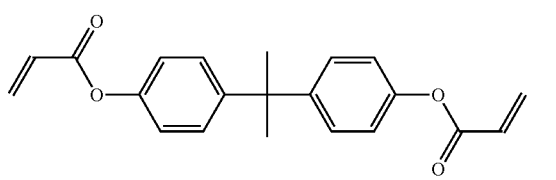

[Chemical Formula 21]

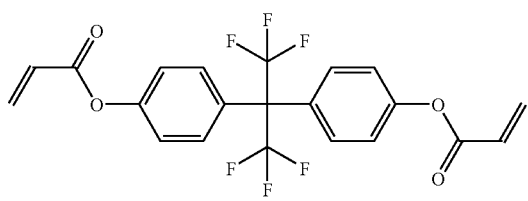

In Chemical Formula 11, the mesogen is a naphthalene group, the photo-polymerizable group is a methacrylate group, and the number of photo-polymerizable groups is two.

In Chemical Formula 12, the mesogen is a biphenyl group, the photo-polymerizable group is a methacrylate group, and the number of photo-polymerizable groups is two.

In Chemical Formula 13, the mesogen is a biphenyl group, the photo-polymerizable group is an acrylate group, and the number of photo-polymerizable groups is two.

In Chemical Formula 14, the mesogen is a fluorine substituted biphenyl group, the photo-polymerizable group is an acrylate group, and the number of photo-polymerizable groups is two.

In Chemical Formula 15, the mesogen is a fluorine substituted biphenyl group, the photo-polymerizable group is an acrylate group, and the number of photo-polymerizable groups is two.

In Chemical Formula 16, the mesogen is a fluorine substituted biphenyl group, the photo-polymerizable group is an acrylate group, and the number of photo-polymerizable groups is two.

In Chemical Formula 17, the mesogen is a fluorine substituted biphenyl group, the photo-polymerizable group is an acrylate group, and the number of photo-polymerizable groups is two.

In Chemical Formula 18, the mesogen is a fluorine substituted biphenyl group, the photo-polymerizable group is an acrylate group, and the number of photo-polymerizable groups is two.

In Chemical Formula 19, the mesogen is a bisphenol-A group, the photo-polymerizable group is a methacrylate group, and the number of photo-polymerizable groups is two.

In Chemical Formula 20, the mesogen is a bisphenol-A group, the photo-polymerizable group is an acrylate group, and the number of photo-polymerizable groups is two.

In Chemical Formula 21, the mesogen is a fluorine substituted bisphenol-A group, the photo-polymerizable group is an acrylate group, and the number of photo-polymerizable groups is two.

A second alignment assistant may be contained in an amount between about 40 wt. % to about 90 wt. %, with respect to a total content of the first and the second alignment assistants.

The first and the second alignment assistant may be contained in an amount about 0.1 wt. % to about 10 wt. % with respect to the content of the liquid crystal. When the first and the second alignment assistants are contained in an amount less than about 0.1 wt. %, it may be difficult to control a pre-tilt of the liquid crystal, and when the first and the second alignment assistants are contained in an amount greater than about 10 wt. %, the content of the liquid crystal may be reduced, thereby deteriorating a display characteristic.

The alignment assistant may be polymerized by light.

The polymerization of the alignment assistant is described with reference to FIG. 5 as well as FIG. 2 to FIG. 4.

Figure 5:
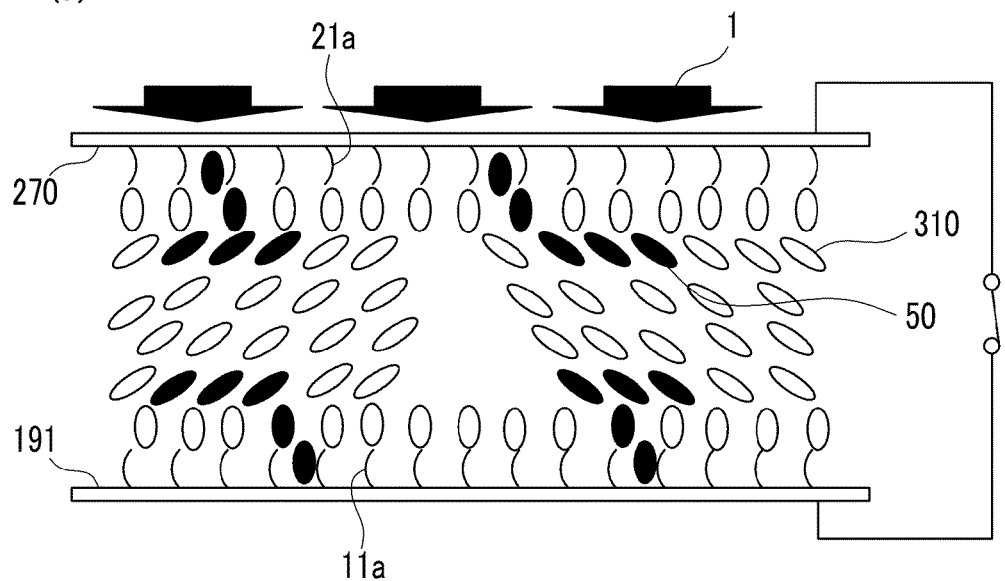
FIG. 5 is a schematic diagram showing an exemplary embodiment of a method of pretilting a liquid crystal using an alignment assistant.
Figure 5:
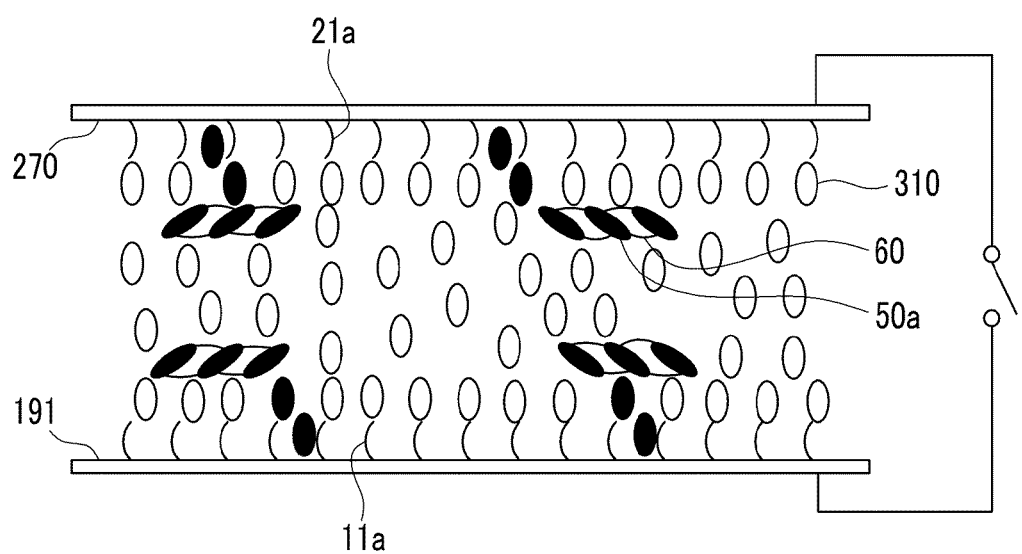

FIG. 5 is a schematic diagram of an exemplary embodiment of a method of pretilting a liquid crystal using an alignment assistant.

First, a thin film transistor array panel 100 and a common electrode panel 200 are disposed.

The thin film transistor array panel 100 may be manufactured by the following method.

A plurality of thin films are disposed on a substrate 110 to sequentially dispose a gate line 121, including a gate electrode 124 and an end portion 129, a gate insulating layer 140, a semiconductor 154, a data line 171 including a source electrode 173 and an end portion 179, a drain electrode 175, and a passivation layer 180.

Next, a conductive layer, comprising a conductive material including ITO, IZO, or the like, or a combination comprising at least one of the foregoing conductive materials, is disposed on the passivation layer 180 and patterned to form a pixel electrode 191 including a longitudinal stem 192, a transverse stem 193, and a plurality of branches 194a, 194b, 194c, and 194d, as shown in FIG. 2 and FIG. 3. In an embodiment, the branches 194a, 194b, 194c, and 194d may be minute.

Next, an alignment layer 11 may be disposed on the pixel electrode 191.

The common electrode panel 200 may be manufactured by the following method.

A light blocking member 220 is disposed on a substrate 210, and a color filter 230 is disposed on the substrate 210 and the light blocking member 220. An overcoat 250 is disposed on substantially an entire surface of the substrate, the color filter 230, and the light blocking member 220, and a common electrode 270 is disposed on the overcoat 250. Next, an alignment layer 21 is disposed on the common electrode 270.

The thin film transistor array panel 100 and the common electrode panel 200 are assembled, and a liquid crystal layer 3 is disposed, for example by injecting a mixture comprising a liquid crystal 310, and an alignment assistant 50. In an embodiment, the liquid crystal layer 3 may comprise a first and a second alignment assistant. In another embodiment, the liquid crystal layer 3 may be disposed by dripping a mixture comprising a liquid crystal 310 and an alignment assistant 50 on at least one of the thin film transistor array panel 100 and the common electrode panel 200.

Next, referring to FIG. 5(a) and FIG. 3, a voltage is applied between the pixel electrode 191 and the common electrode 270. The liquid crystal 310 and the alignment assistant 50 are inclined parallel to a length direction of the branches 194a, 194b, 194c, and 194d of the pixel electrode 191. The liquid crystal 310 disposed adjacent to the alignment layer 11 may maintain a perpendicular alignment using a chain 11a of the alignment layer 11.

A light 1 may be irradiated while a voltage is applied between the pixel electrode 191 and the common electrode 270. Accordingly, a portion of the alignment assistant 50 may be photo-polymerized to form a polymer 50a. The polymer 50a may control a pre-tilt of the liquid crystal 310.

Next, as shown in FIG. 5(b), a voltage between the pixel electrode 191 and the common electrode 270 is off.

Next, light is irradiated on the liquid crystal layer 3 while the voltage between the pixel electrode 191 and the common electrode 270 is not applied. Accordingly, a degree of polymerization may be increased.

The liquid crystal layer 3 may include the polymer 50a, which is polymerized by light, and a residual content of non-polymerized alignment assistant 50. Thus a liquid crystal display may comprise a liquid crystal layer, the liquid crystal layer comprising a portion of the alignment assistant, which is polymerized by light, and a non-polymerized portion of the alignment assistant. In another embodiment the alignment assistant 50 may includes three or more photo-polymerizable groups, which are described above, such that the polymerization reactivity may be improved, and as a result a residual content of non-polymerized alignment assistant (alignment assistant which is not photo-polymerized) may be reduced. In a liquid crystal display according to an exemplary embodiment, the residual content of non-polymerized alignment assistant may be less than or equal to about 5 wt. % of the total content of the alignment assistant.

When the content of the non-polymerized alignment assistant is greater than about 5 wt. %, a variability in a pre-tilt may causes a difference in a black/white display unit such that an afterimage may be observable.

Figure 8:
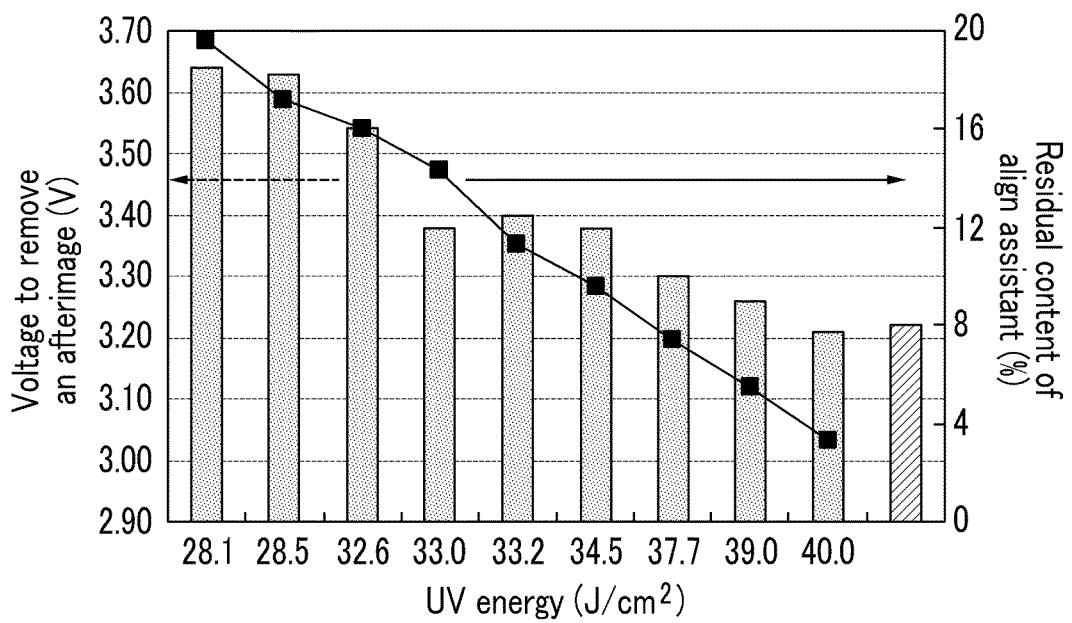
FIG. 8 is a graph showing a residual content of a non-polymerized alignment assistant, and a voltage to remove an afterimage, with respect to an irradiation energy when irradiating light to polymerize an exemplary embodiment of an alignment assistant of a liquid crystal display.

FIG. 8 shows this result. FIG. 8 is a graph showing a residual content of non-polymerized alignment assistant and a voltage to remove an afterimage with respect to an irradiation energy when irradiating light to polymerize an exemplary embodiment of an alignment assistant of the liquid crystal display.

Referring to FIG. 8, a residual content of non-polymerized alignment assistant is reduced with increasing light irradiation, and when the energy of irradiation is about 40 J/cm$^2$, the residual content of non-polymerized alignment assistant is reduced to about 3.3 wt. %, based on the total content of an alignment assistant. Accordingly, an afterimage, which may be caused by non-polymerized alignment, assistant may be reduced, thereby improving a display characteristic.

An afterimage is further described with reference to FIG. 6a to 7b.

FIG. 6A to FIG. 7B are photographs showing an afterimage evaluation result of an exemplary embodiment of a liquid crystal display and an afterimage evaluation result of a liquid crystal display according to a comparative example.

The afterimage evaluation may be performed by the following method.

First, a display panel including two substrates each disposed with a field generating electrode, and a liquid crystal layer interposed therebetween, is provided. On the display panel, a plurality of pixels are disposed. An image is displayed wherein a portion of the pixels that are alternately disposed in the longitudinal and transverse directions among the plurality of pixels represent black, and the remaining pixels represent white such that the pixels represent a black/white pattern comprising a lattice shape. Next, the black/white image is removed after a predetermined time, and when the total screen of the display panel changes from black to white and displays a uniform gray, the display is examined to determine whether a stain of a line shape is observable on a boundary of a pixel.

Figure 6A:
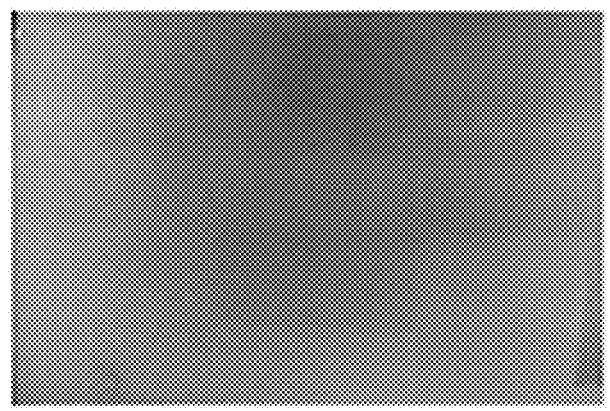
FIG. 6A and FIG. 6B are photographs showing an afterimage evaluation result of an exemplary embodiment of a liquid crystal display and a liquid crystal display according to a comparative example, respectively.
Figure 6B:
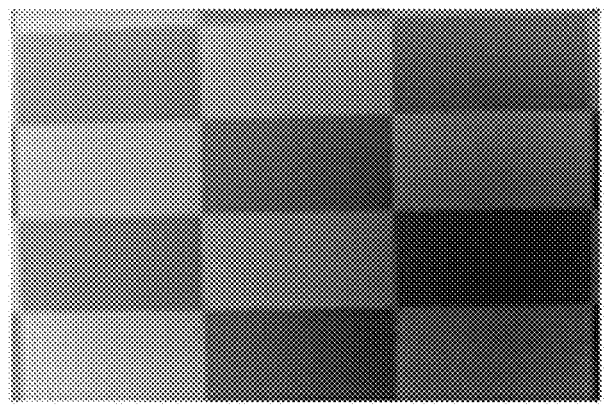
Figure 7A:
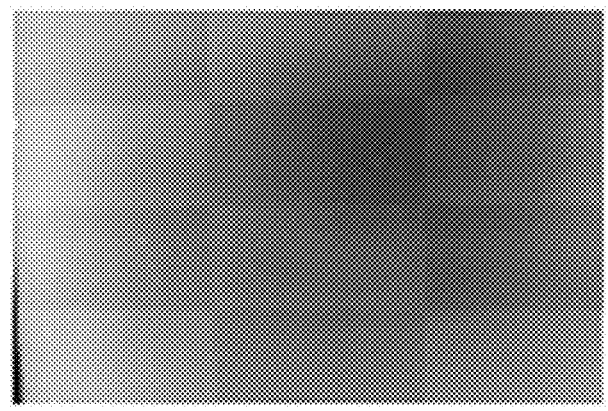
FIG. 7A and FIG. 7B are photographs showing an afterimage evaluation result of another exemplary embodiment of a liquid crystal display and a liquid crystal display according to a comparative example, respectively.
Figure 7B:
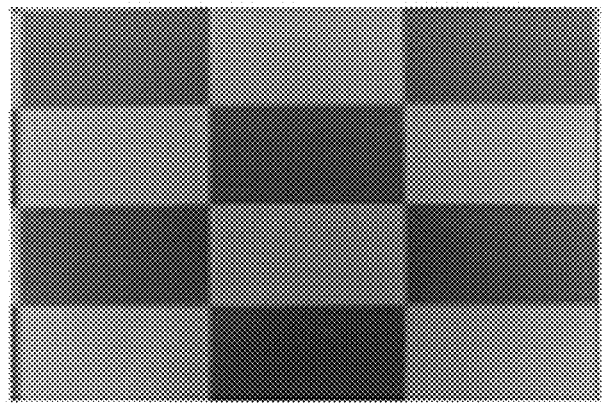

FIG. 6A and FIG. 6B are photographs showing the existence and the nonexistence of an afterimage after displaying a black/white image for about 24 hours, and FIG. 7A and FIG. 7B are photographs showing the existence and the nonexistence of an afterimage after displaying a black/white image for about 168 hours.

FIG. 6A represents about 90 grays, FIG. 6B represents about 220 grays, FIG. 7A represents about 180 grays, and FIG. 7B presents about 245 grays, therefore it has been surprisingly observed that an afterimage remains less in the exemplary liquid crystal displays (FIG. 6A and FIG. 7A) than the liquid crystal displays according to the comparative examples (FIG. 6B and FIG. 7B), and as shown in the photographs of FIG. 6A to FIG. 7B, the afterimage is remarkably improved in the liquid crystal display according to an exemplary embodiment compared with the liquid crystal display according to the comparative example.

Thus a liquid crystal display according to an exemplary embodiment includes an alignment assistant such that a pre-tilt of a liquid crystal may be uniformly controlled, and the alignment assistant may include a selected group such that a residual content of a non-polymerized alignment assistant, which may remain in a liquid crystal layer, may be reduced. Accordingly, an afterimage, which may be caused by the non-polymerized alignment assistant, may be substantially reduced or prevented, thereby improving a display characteristic.

While this invention has been described in connection with what is presently considered to be practical exemplary embodiments, it is to be understood that the invention is not limited to the disclosed embodiments, but, on the contrary, is intended to cover various modifications and equivalent arrangements which are included within the spirit and scope of the appended claims.

What is claimed is:

1. A liquid crystal display comprising:
a first substrate;
a second substrate facing the first substrate;
a first field generating electrode disposed on the first substrate;
a second field generating electrode disposed on the second substrate; and
a liquid crystal layer disposed between the first substrate and the second substrate, the liquid crystal layer including a liquid crystal and an alignment assistant,
wherein the alignment assistant includes at least one compound selected from the group of compounds represented by Chemical Formulas 3 and 4:

[Chemical Formula 3]

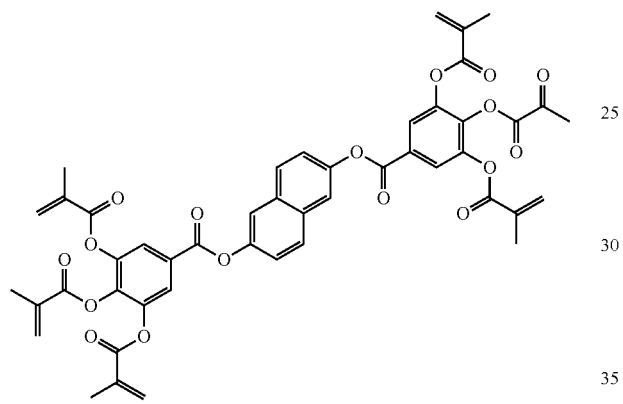

[Chemical Formula 4]

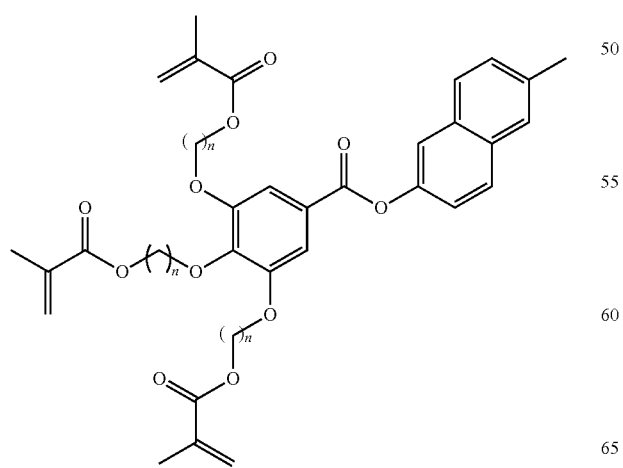

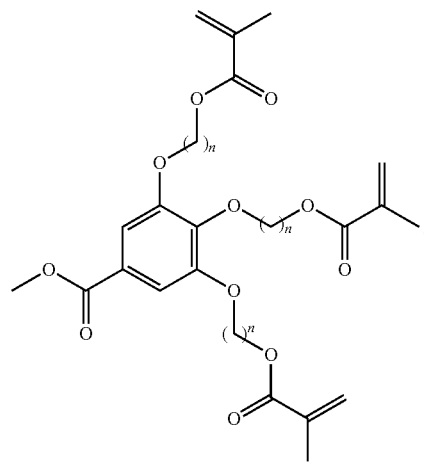

2. The liquid crystal display of claim 1, wherein the photo-polymerizable group includes at least one group selected from the group consisting of an acrylate group, a methacrylate group, and a combination comprising at least one of the foregoing groups.

3. The liquid crystal display of claim 2, further comprising:
a $C_3$-$C_{12}$ alkyl group disposed between the mesogen and the photo-polymerizable group.

4. The liquid crystal display of claim 1, wherein
the alignment assistant is contained in an amount between about 0.1 weight percent to about 10 weight percent with respect to the content of the liquid crystals.

5. The liquid crystal display of claim 1, wherein
at least one of the first and the second field generating electrodes comprises a branch shape.

6. The liquid crystal display of claim 1, wherein
the alignment assistant comprises a non-polymerized alignment assistant; and
the non-polymerized alignment assistant is contained in an amount equal to or less than about 5 weight percent with respect to a total content of the alignment assistant.

7. A liquid crystal display comprising:
a first substrate;
a second substrate facing the first substrate;
a first field generating electrode disposed on the first substrate;
a second field generating electrode disposed on the second substrate; and
a liquid crystal layer disposed between the first substrate and the second substrate, the liquid crystal layer including a liquid crystal and an alignment assistant,
wherein the alignment assistant includes at least one compound represented by the Chemical Formula 1:

[Chemical Formula 1]
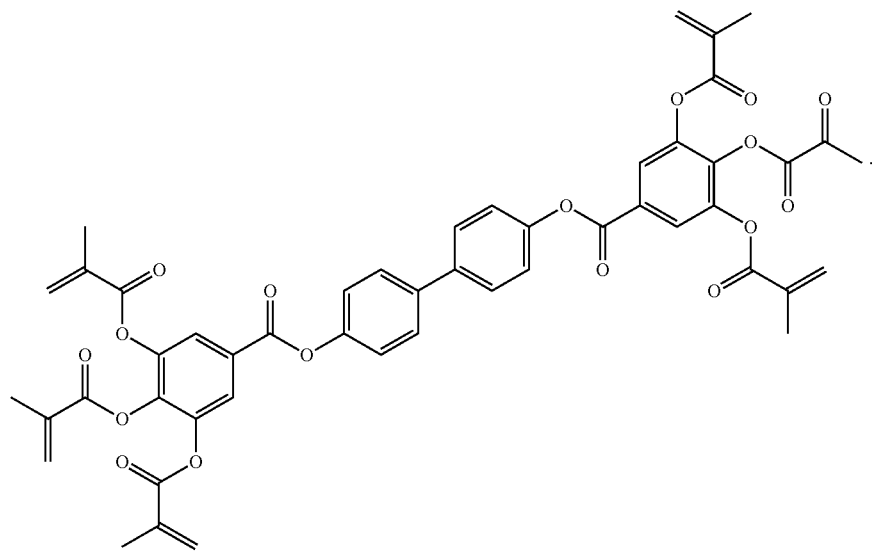
* * * * *